United States Patent
Morimatsu et al.

(10) Patent No.: US 6,917,648 B1
(45) Date of Patent: Jul. 12, 2005

(54) ENCODER AND DECODER FOR MOVING PICTURE

(75) Inventors: Eishi Morimatsu, Kanagawa (JP); Akira Nakagawa, Kanagawa (JP); Atsushi Ichiki, Kanagawa (JP); Takashi Itoh, Kanagawa (JP); Taizo Anan, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/558,070

(22) Filed: Apr. 26, 2000

(30) Foreign Application Priority Data

Apr. 30, 1999 (JP) .......................................... 11-123863
Mar. 31, 2000 (JP) ...................................... 2000-097214

(51) Int. Cl.[7] .............................................. H04N 7/12
(52) U.S. Cl. .............................................. 375/240.01
(58) Field of Search ....................... 375/240.01, 240.02, 375/240.03, 240.12, 240.13, 240.18, 240.2, 240.21, 240.22, 240.23, 240.24, 240.25, 240.29; H04N 7/12

(56) References Cited

U.S. PATENT DOCUMENTS

| | | | | |
|---|---|---|---|---|
| 5,589,993 A | * | 12/1996 | Naimpally | 386/81 |
| 5,812,194 A | * | 9/1998 | Wilkinson | 375/240.15 |
| 5,825,424 A | * | 10/1998 | Canfield et al. | 375/240.15 |
| 6,023,553 A | * | 2/2000 | Boyce et al. | 386/109 |
| 6,411,651 B1 | * | 6/2002 | Rose et al. | 375/240.13 |

FOREIGN PATENT DOCUMENTS

JP          11069304 A  *  3/1999  ............ H04N/5/92

* cited by examiner

*Primary Examiner*—Nhon Diep
(74) *Attorney, Agent, or Firm*—Staas & Halsey LLP

(57) ABSTRACT

A selection unit selects '0' for the first through the (N−1)th frames, and selects a predicted image for the subsequent frames. Thus, an intra-frame coding process is performed on the first through the (N−1)th frames, and an adaptive coding process is performed on the subsequent frames. An information amount reduction unit reduces the amount of information about data in the first through the (N−1)th frames. An information amount adjustment unit stepwise increases the amount of information reduced by the information amount reduction unit.

11 Claims, 27 Drawing Sheets

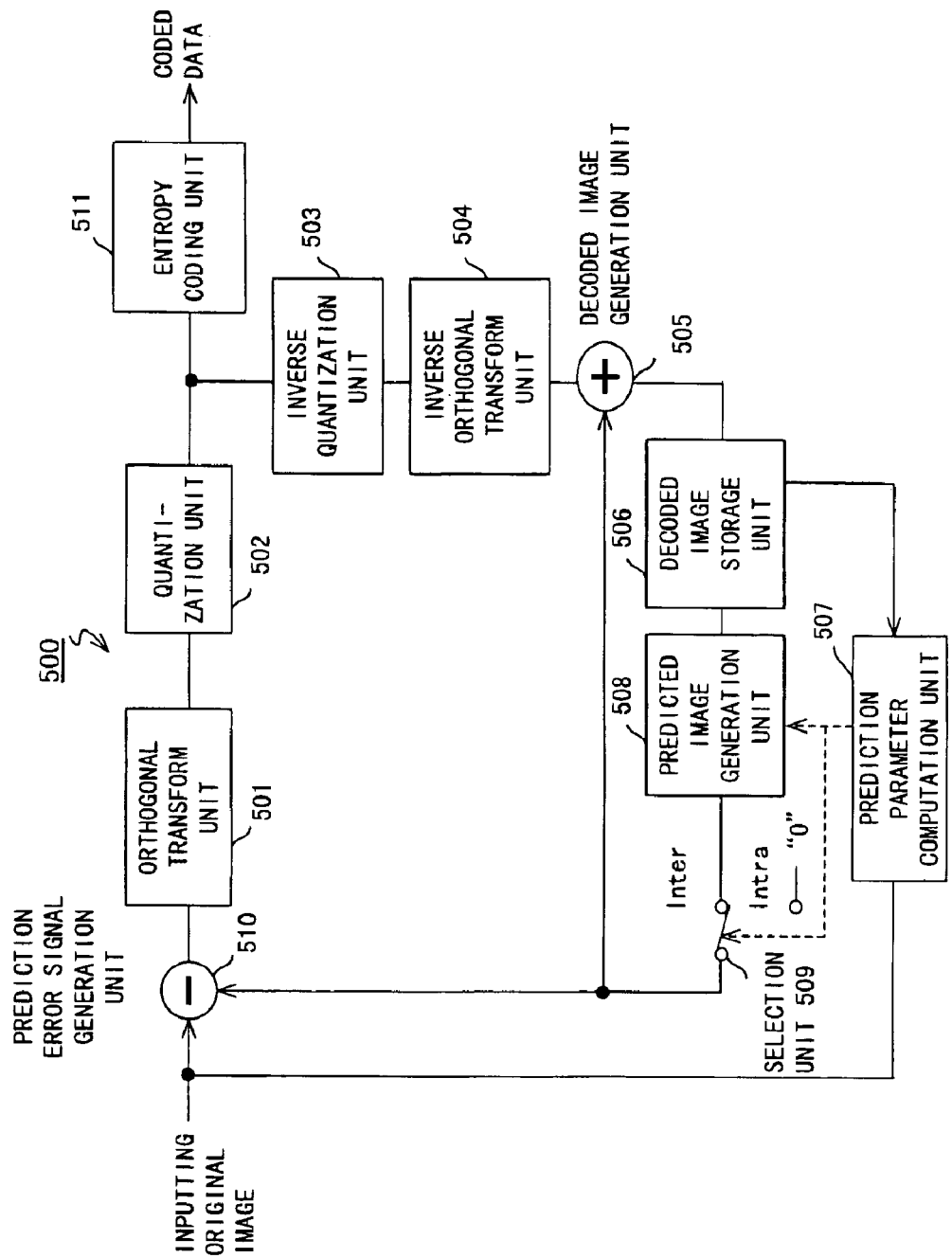
F I G. 1

| B11 | B12 | B13 | B14 | B15 |
|-----|-----|-----|-----|-----|
| B21 | B22 | B23 | B24 | B25 |
| B31 | B32 | (B33) | (B34) | B35 |
| B41 | (B42) | B43 | B44 | B45 |
| B51 | B52 | B53 | B54 | B55 |

TARGET BLOCK
(IN WHICH ERROR HAS OCCURED)

FIG. 8

PREVIOUS FRAME
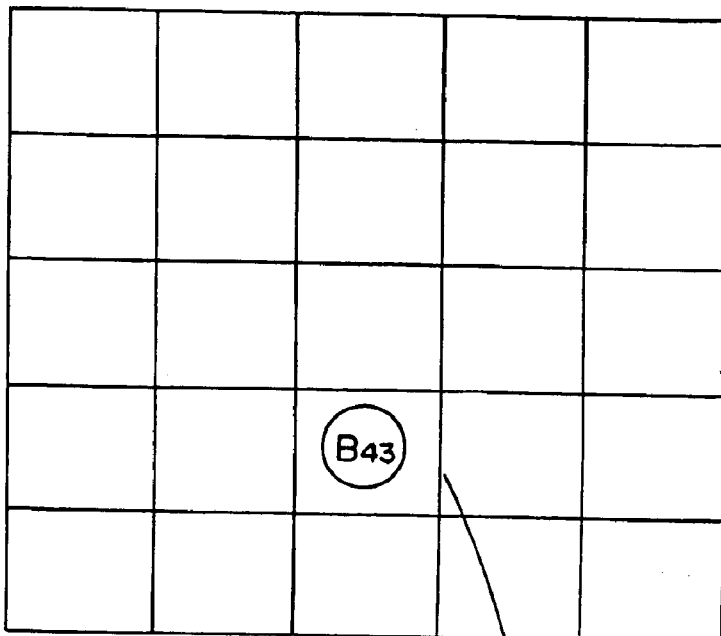
REPLACEMENT
TARGET FRAME
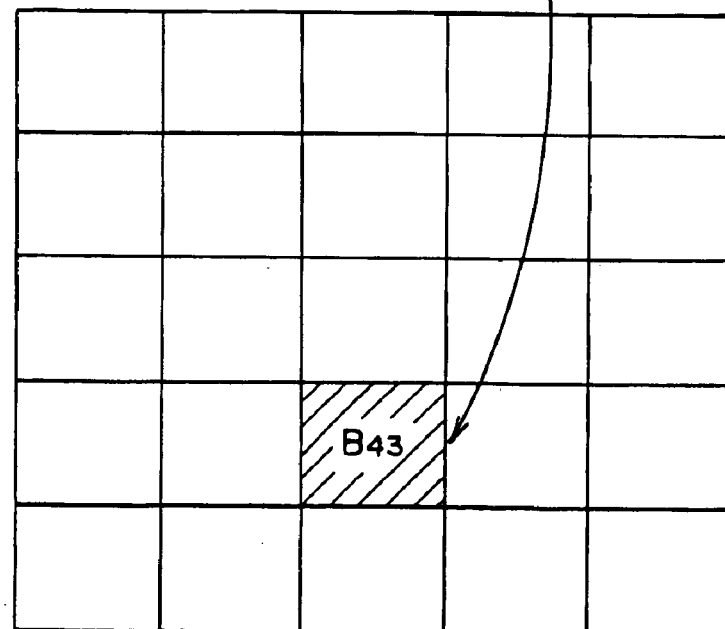
FIG. 9

| FRAME COUNTER VALUE | 1 | ... | N−1 | N | N+1 | ... | M−1 | M | M+1 | ... |
|---|---|---|---|---|---|---|---|---|---|---|
| CONTROL SIGNAL 1 | Intra | | Intra | Adaptive | Adaptive | | Adaptive | Adaptive | Adaptive | |
| CONTROL SIGNAL 2 | LIMITED | | LIMITED | LIMITED | LIMITED | | LIMITED | LIMITED | NO LIMIT | |
| CONTROL SIGNAL 3 | 1 | | 1 | 1 | 2 | | 7 | 8 | UNUSED | |

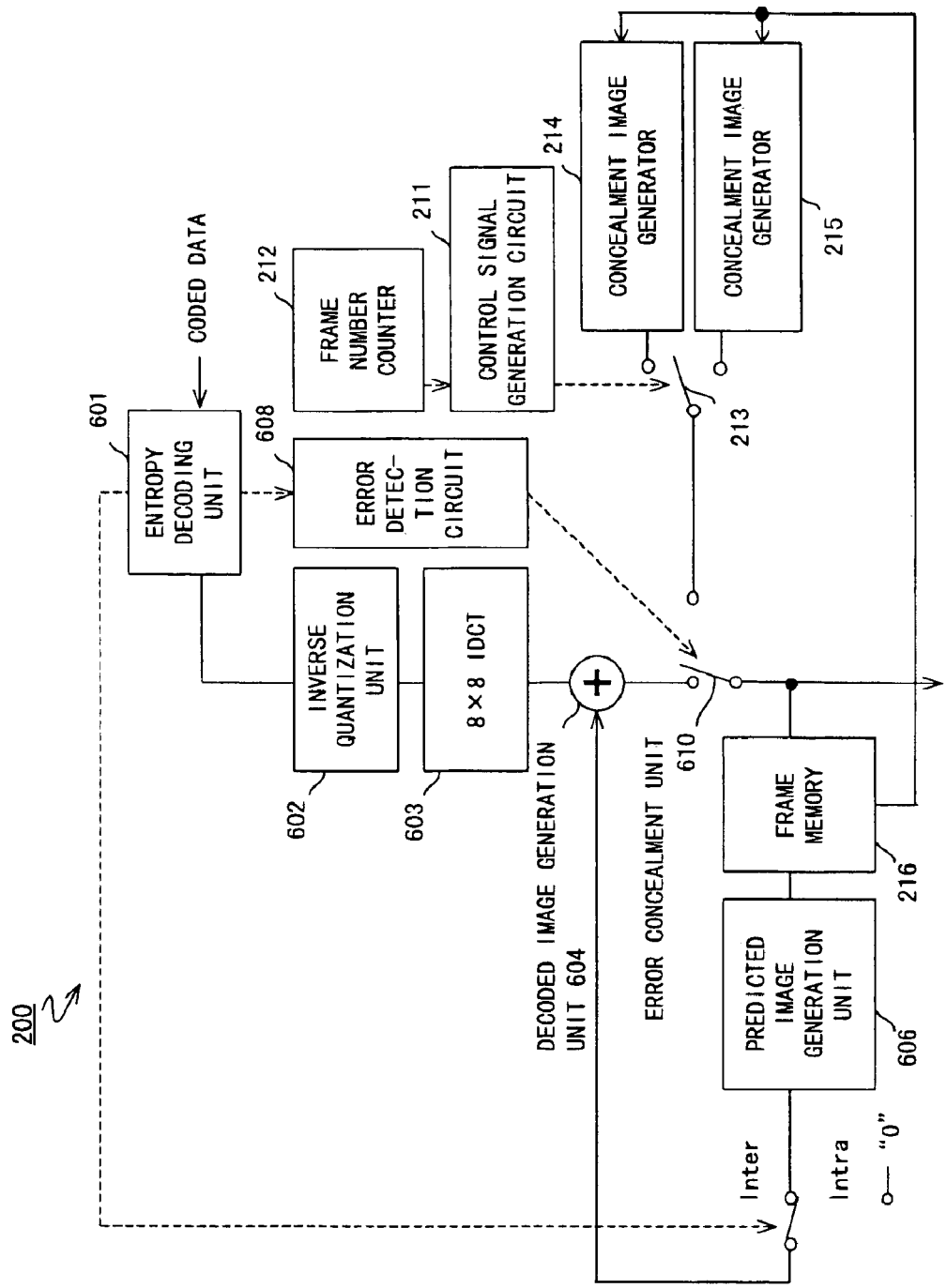
F I G. 17

| FRAME COUNTER VALUE | 1 | VALUE OTHER THAN 1 |
|---|---|---|
| CONTROL SIGNAL | GENERATION OF CONCEALMENT IMAGE FROM CURRENT IMAGE | GENERATION OF CONCEALMENT IMAGE FROM PREVIOUS IMAGE |

F I G. 1 8

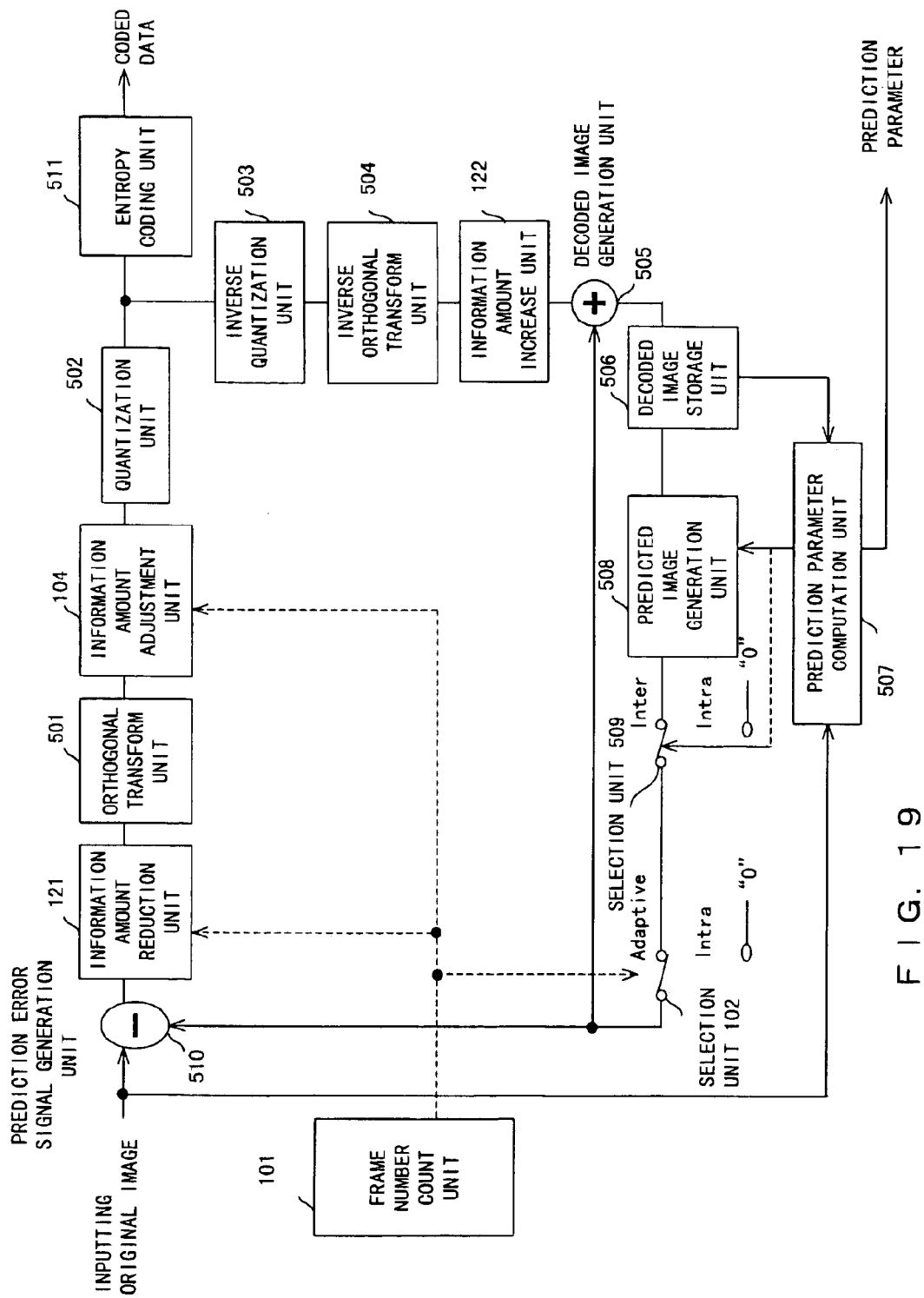
F I G. 19

| FRAME COUNTER VALUE | 1 | ... | N-1 | N | N+1 | ... | M-1 | M | M+1 | ... |
|---|---|---|---|---|---|---|---|---|---|---|
| CONTROL SIGNAL 1 | Intra | | Intra | Adaptive | Adaptive | | Adaptive | Adaptive | Adaptive | |
| CONTROL SIGNAL 2 | NO LIMIT | | NO LIMIT | LIMITED | LIMITED | | LIMITED | LIMITED | NO LIMIT | |
| CONTROL SIGNAL 3 | UNUSED | | UNUSED | 1 | 2 | | 7 | 8 | UNUSED | |
| CONTROL SIGNAL 4 | WITH SAMPLING | | WITH SAMPLING | WITHOUT SAMPLING | WITHOUT SAMPLING | | WITHOUT SAMPLING | WITHOUT SAMPLING | WITHOUT SAMPLING | |

FIG. 22A

| FRAME COUNTER VALUE | 1 | ... | N-1 | N | N+1 | ... | M-1 | M | M+1 | ... |
|---|---|---|---|---|---|---|---|---|---|---|
| CONTROL SIGNAL 1 | Intra | | Intra | Adaptive | Adaptive | | Adaptive | Adaptive | Adaptive | |
| CONTROL SIGNAL 2 | LIMITED | | LIMITED | LIMITED | LIMITED | | LIMITED | LIMITED | NO LIMIT | |
| CONTROL SIGNAL 3 | 1 | | 1 | 1 | 2 | | 7 | 8 | UNUSED | |
| CONTROL SIGNAL 4 | WITH SAMPLING | | WITH SAMPLING | WITHOUT SAMPLING | WITHOUT SAMPLING | | WITHOUT SAMPLING | WITHOUT SAMPLING | WITHOUT SAMPLING | |

FIG. 22B

F I G. 23

ENCODER AND DECODER FOR MOVING PICTURE

BACKGROUND OF THE INVENTION

1. Field of the Invention

The present invention relates to an encoder and a decoder for moving picture, and more specifically to a hybrid-type moving picture coding system for performing a motion compensating process and an orthogonal transforming process for each block obtained by dividing an input image into a plurality of blocks.

2. Description of the Related Art

Since the volume of moving picture data is normally large, a coding process is performed to compress the data when it is transmitted from a transmission device to a reception device, or when it is stored in a storage device.

FIG. 1 is a block diagram of a conventional encoder. FIG. 2 is a block diagram of a conventional decoder for decoding moving picture data coded by the encoder shown in FIG. 1. In this example, the hybrid coding system realized by combining a motion compensation inter-frame predicting process and an orthogonal transforming process is explained as follows.

An encoder 500 divides an input image into a plurality of blocks (each block comprises L rows x M columns) for each frame, and performs a coding process on each block. That is, the encoder 500 first generates a predicted image for each block, and computes difference data between the predicted image and an actually input image (target image). Then, it performs an orthogonal transforming process, a quantizing process, and an entropy coding process on the difference data, and outputs resultant data. At this time, a prediction parameter (a motion vector in this example) is also output.

An orthogonal transform unit 501 orthogonally transforms given data. An orthogonal transforming process can be, for example, DCT (discrete cosine transform). A quantization unit 502 quantizes an output of the orthogonal transform unit 501. An inverse quantization unit 503, an inverse orthogonal transform unit 504, and a decoded image generation unit 505 are provided to generate an image which is the same as that to be regenerated by a decoder 600 shown in FIG. 2. The image generated through these units is stored in a decoded image storage unit 506.

A prediction parameter computation unit 507 computes a parameter (a motion vector in this example) for prediction of an image based on the image stored in the decoded image storage unit 506 and a newly input image, and determines whether an inter-frame coding process is to be performed, or an intra-frame coding process is to be performed. A predicted image generation unit 508 generates a predicted image based on the image stored in the decoded image storage unit 506, and the motion vector computed by the prediction parameter computation unit 507. That is, based on an image in a frame at a timing, the predicted image generation unit 508 predicts an image in a frame at the next timing, and outputs the predicted image. The predicted image is to be generated also in a decoder.

A selection unit 509 switches data to be selected at an instruction from the prediction parameter computation unit 507. The selection unit 509 selects an output of the predicted image generation unit 508 when an inter-frame coding process is to be performed, and selects '0' when an intra-frame coding process is to be performed.

A prediction error signal generation unit 510 generates a signal indicating an error between an actually input image and an output of the selection unit 509. That is, the prediction error signal generation unit 510 generates a signal indicating an error between a predicted image in the preceding frame and an input image when the inter-frame coding process is performed. On the other hand, when the intra-frame coding process is performed, since the output of the selection unit 509 is 0, the prediction error signal generation unit 510 outputs a signal indicating the input image as is.

The output signal is a predicted error signal to be transmitted to a decoder. The predicted error signal is encoded by the orthogonal transform unit 501, the quantization unit 502, and an entropy coding unit 511, and is then transmitted to the decoder 600. The motion vector obtained by the prediction parameter computation unit 507 is also transmitted to the decoder 600.

For each block, the decoder 600 decodes the coded data coded by the encoder 500. An entropy decoding unit 601 corresponds to the entropy coding unit 511. In addition, an inverse quantization unit 602, an inverse orthogonal transform unit 603, a decoded image generation unit 604, a decoded image storage unit 605, a predicted image generation unit 606, and a selection unit 607 are respectively the same as the inverse quantization unit 503, the inverse orthogonal transform unit 504, the decoded image generation unit 505, the decoded image storage unit 506, the predicted image generation unit 508, and the selection unit 509 provided in the encoder 500. Therefore, an output of the decoded image generation unit 604 is an image to be regenerated. The predicted image generation unit 606 generates a predicted image using a motion vector transmitted from the encoder 500.

Thus, in the inter-frame prediction coding method, the prediction data for each block in a target frame is generated using the data in the previously transmitted frame, and the coding process is performed using the prediction data. Here, since the moving picture data has high correlativity in the time direction, an efficient compressing process can be realized using the above described prediction data. It is well-known that the compression rate by the inter-frame coding process is higher than that by the intra-frame coding process. Especially when moving picture data indicating a scene with a smaller change is coded, the effect of a highly efficient process is apparent.

The above described inter-frame prediction coding method is adopted in the standard systems such as ITU-T H.261, ITU-T H.263, MPEG-1, MPEG-2, MPEG-4, etc.

The above described coding method can also be used in an environment in which transmission errors are easily generated as in the radio communications system. Therefore, the decoder 600 includes the function of concealing errors when it detects the errors.

That is, when an error detection unit 608 detects an error, it notifies an error concealment unit 610 of a block in which the error has been detected. On the other hand, an error concealment image generation unit 609 extracts an image in the corresponding block in the previous frame from the decoded image storage unit 605. When the error concealment unit 610 receives the notification from the error detection unit 608, it replaces the image in the block in which the error has been detected with the image extracted by the error concealment image generation unit 609.

Thus, when a transmission error occurs, the decoder 600 conceals the error using the data in the previous frame.

However, when an error occurs in the initial frame (the first frame, or the leading frame) of moving picture, the above described concealing process cannot be performed because the decoder 600 does not have the 'data in the previous frame'. In this case, the decoder 600 cannot sufficiently conceal the error, and the regenerated image of the first frame contains a block discontinuous to the adjacent blocks as shown in FIG. 3. That is, the quality of the moving picture is considerably deteriorated.

When image data in a frame is decoded in the inter-frame prediction coding process as described above, the image data in the previous frame is used. That is, the image data decoded at a given timing is used when the subsequent image data is decoded. Therefore, once an error has occurred in the inter-frame prediction coding process, the undesired influence of the error on the image quality is propagated to the subsequent frames.

Therefore, when an error occurs in the first frame of moving picture and the error cannot be appropriately concealed in the conventional coding system, the undesired influence of the error on the quality of an image is propagated to the subsequent frames. That is, when an error occurs in the first frame, it takes a long time to obtain an acceptable image even if no errors occur in the subsequent frames.

The above described problem does not occur only in the first frame of moving picture. For example, assuming that an error occurs in a frame immediately after the moving picture has changed from a certain scene to quite a different scene, a similar problem occurs because the decoder does not contain effective 'data in the previous frame' to conceal the error.

Thus, if an error occurs in the first frame of moving picture or in a frame immediately after a scene changes into another scene in the conventional decoding system, it takes a long time to obtain an acceptable image.

SUMMARY OF THE INVENTION

The present invention aims at providing an encoder and a decoder capable of immediately obtaining an excellent image even when a transmission error occurs in moving picture data.

The encoder according to the present invention has the configuration in which an image in each frame of moving picture is divided into a plurality of blocks and a coding process is performed on each block. The encoder includes a coding unit for performing an intra-frame coding process or an inter-frame coding process on given data; and an information amount reduction unit for reducing the amount of information about given data. The intra-frame coding process is performed by the coding unit on each block in a plurality of consecutive frames containing the first frame, and the information amount reduction unit reduces the amount of information about the data coded by the coding unit. The coding unit adaptively performs the intra-frame coding process or the inter-frame coding process on each block in the frames subsequent to the above described plurality of frames.

With the configuration above, the intra-frame coding process is performed on a plurality of consecutive frames containing the first frame of the moving picture. The resultant information amount of the intra-frame coding process is normally larger than that of the inter-frame coding process. Therefore, the information amount reduction unit reduces the amount of information about data to be coded in the frame in which the intra-frame coding process is forcibly performed. For example, the information amount reduction unit reduces the amount of information per frame obtained in the intra-frame coding process down to the amount of information which would be obtained in the inter-frame coding process. As a result, even a frame on which the intra-frame coding process is forcibly performed does not require an increased amount of actually transmitted information about data.

In the above described encoder, a detection unit for detecting a discontinuous point in input moving picture can also be provided to perform the intra-frame coding process by the coding unit on each block in a plurality of consecutive frames containing a frame immediately after the discontinuous point is detected by the detection unit, and to reduce by the information amount reduction unit the amount of information about data to be coded by the coding unit. If the above described configuration is adopted, the operation performed on the first frame can also be performed on the frame immediately after a scene change in moving picture.

The information amount reduction unit reduces the amount of information about data by, for example, reducing the spatial resolution of an image. Described below are examples of methods of reducing the spatial resolution of an image. (1) Only direct current elements in the frequency elements after the orthogonal transforming process are transmitted. (2) An input image is down-sampled.

The encoder according to the present invention can include, in addition to the above described configuration, an information amount adjustment unit for stepwise increasing the amount of information of each block from the state in which the amount of information is reduced by the information amount reduction unit.

With this configuration, an image is smoothly changed when the period of the above described forcible intra-frame coding process is switched into the period of adaptively selecting the intra-frame coding process or the inter-frame coding process.

The decoder for decoding the data coded by the encoder includes an error detection unit for detecting a transmission error for each block or for a plurality of blocks; and a concealment unit for, when the error detection unit detects an error in the first frame, concealing the error using an image of another block in the first frame, and for concealing the error using the image in the frame prior to the frame in which the error has been detected when the error has been detected in the subsequent frame.

In the decoder, when an error is detected in a frame, the error is basically concealed using the image in the previous frame. The intra-frame coding process is performed in the image data in a plurality of consecutive frames containing the first frame. Therefore, in those plurality of frames, the influence of an error is propagated to the subsequent frames only when the error continuously occurs in a block at the same position in each frame, However, there is a small possibility that an error continuously occurs in a block at the same position in each frame. Therefore, although an error occurs in the first frame, the deterioration of the quality of an image caused by the error can be quickly reduced in the subsequent frames.

BRIEF DESCRIPTION OF THE DRAWINGS

FIG. 1 is a block diagram of the conventional encoder;

FIG. 8 shows the concealing process performed when an error is detected in the first frame;

FIG. 9 shows the concealing process performed when an error is detected in the second and subsequent frames;

FIG. 12 shows an example of the control signals used by the encoder.

FIG. 15 shows the operation of the frequency control circuit;

FIG. 17 shows a practical example of the decoder according to an embodiment of the present invention;

FIG. 18 shows an example of the control signal used by the decoder;

FIG. 19 is a block diagram of the encoder according to another embodiment of the present invention;

FIGS. 22A and 22B show examples of control signals used by the encoder;

FIG. 23 shows a down-sampling method;

DESCRIPTION OF THE PREFERRED EMBODIMENTS

Embodiments of the present invention are described below by referring to the attached drawings.

Figure 4:
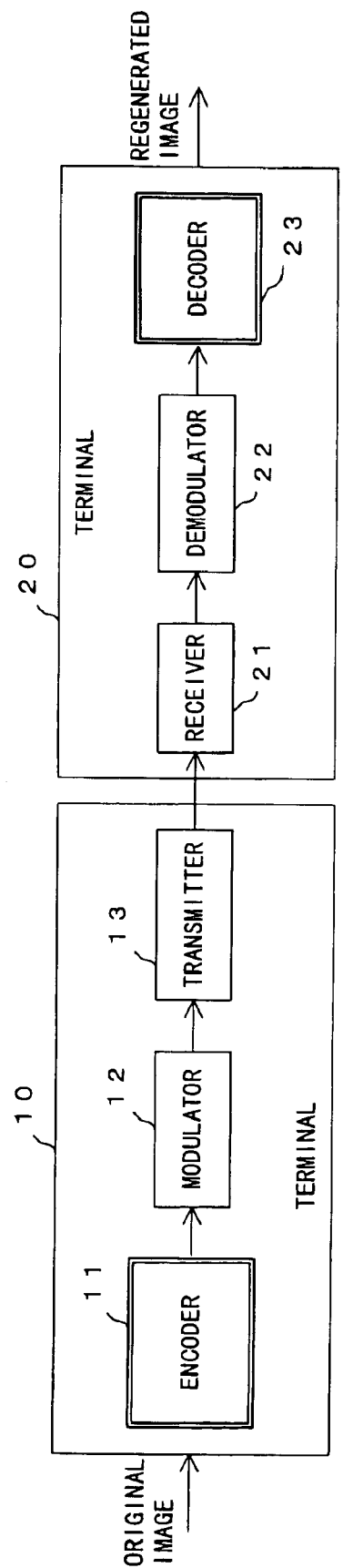
FIG. 4 shows the configuration of the communications system in which the encoder and the decoder according to an embodiment of the present invention are used.

FIG. 4 shows the configuration of the communications system in which the encoder and the decoder according to an embodiment of the present invention are used. In this embodiment, moving picture data is transmitted from a terminal 10 to a terminal 20.

The terminal 10 comprises an encoder 11 for encoding moving picture data to be transmitted; a modulator 12 for modulating the coded data; and a transmitter 13 for transmitting the modulated data to a network. A modulation system is not limited, and a network can be either a public network or a private network such as a LAN. In addition, a transmission line can be a radio line, an optical fiber, or a metallic cable. On the other hand, the terminal 20 comprises a receiver 21 for receiving a signal from a network; a demodulator 22 for demodulating a received signal; and a decoder 23 for decoding the demodulated data and regenerating an image. With the configuration, the encoder according to an embodiment of the present invention corresponds to the encoder 11 provided in the terminal 10, and the decoder according to an embodiment of the present invention corresponds to the decoder 23 provided in the terminal 20.

Figure 5:
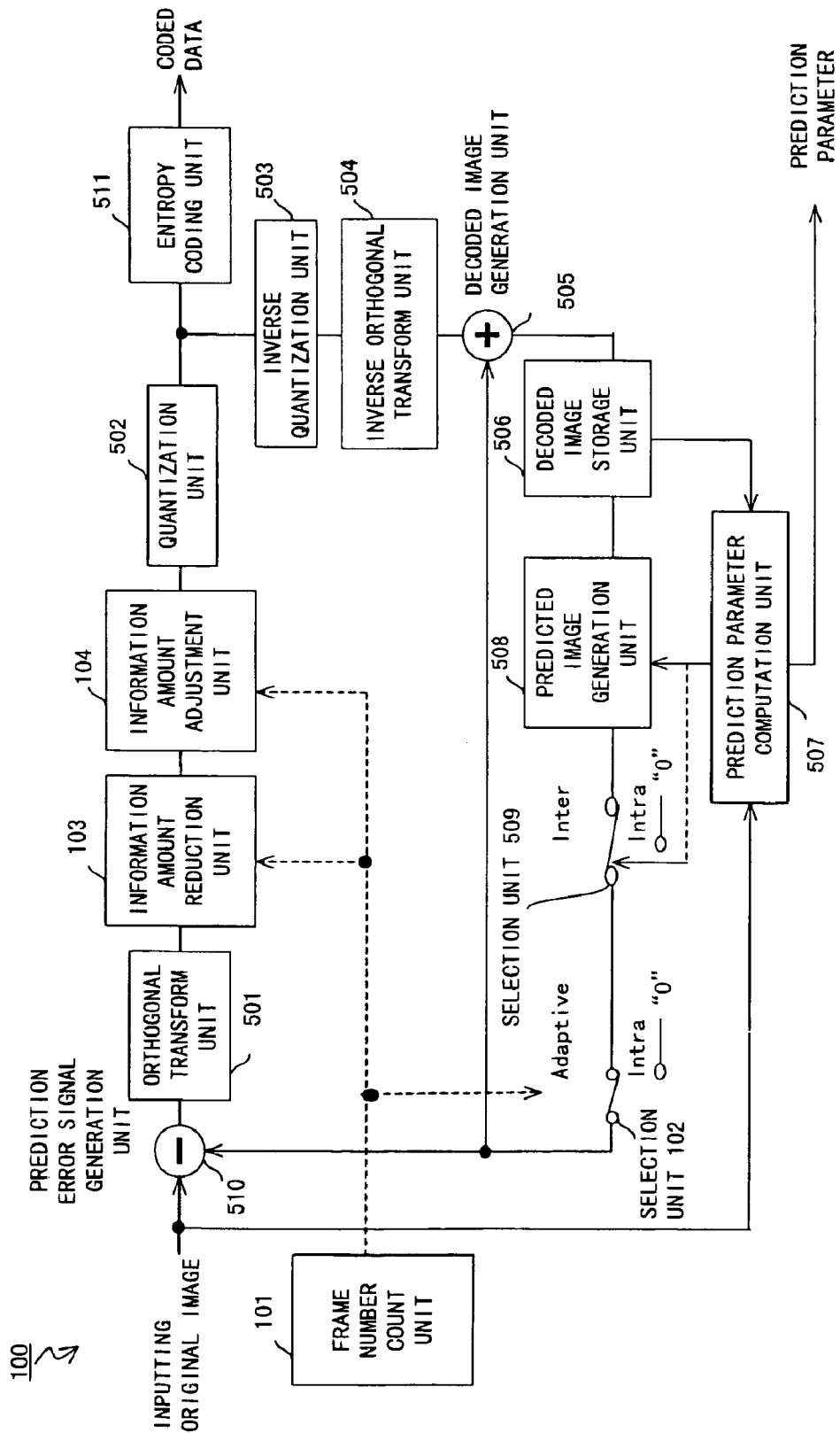
FIG. 5 is a block diagram of the encoder according to an embodiment of the present invention.

FIG. 5 is a block diagram of the encoder according to an embodiment of the present invention. In FIG. 5, unit numbers also shown in FIG. 1 indicate identical units.

The basic configuration of an encoder 100 according to an embodiment of the present invention is the same as the configuration of the encoder 500 shown in FIG. 1. That is, the encoder 100 divides each frame image of moving picture into a plurality of blocks, and adaptively performs the intra-frame coding process or the inter-frame coding process on each block.

The encoder 100 can be realized by providing for the existing encoder 500 shown in FIG. 1 a frame number count unit 101, a selection unit 102, an information amount reduction unit 103, and an information amount adjustment unit 104.

The frame number count unit 101 comprises a counter for counting the number of frames input to the encoder 100, or the number of frames coded by the encoder 100. The frame number count unit 101 starts counting frames from the initial frame (first frame or leading frame). When it counts a predetermined number, it notifies the selection unit 102, the information amount reduction unit 103, and the information amount adjustment unit 104 of the counting result.

The selection unit 102 selects the 'intra-frame coding process' or the 'adaptive coding process' according to the notification from the frame number count unit 101. Actually, before receiving the notification from the frame number count unit 101, the selection unit 102 selects '0' to perform the intra-frame coding process by the encoder 100. After receiving the notification, the selection unit 102 selects the output of the selection unit 509 to perform the adaptive coding process by the encoder 100. The 'adaptive coding process' is a process for determining a coding method (the intra-frame coding process or the inter-frame coding process) for each frame based on the image prediction error.

With the configuration, the encoder 100 performs the intra-frame coding process on a predetermined number of consecutive frames containing the initial frame of moving picture, and then performs the adaptive coding process.

When the adaptive coding process is performed, the intra-frame coding process and the inter-frame coding process can be selectively performed. Therefore, the average amount of information per frame is smaller than in the period in which the intra-frame coding process is continuously performed. That is, in the period in which the intra-frame coding process is continuously performed, the average amount of information to be transmitted per frame is larger than in the period in which the adaptive coding process is performed. The encoder 100 forcibly performs the intra-frame coding process on a predetermined number of consecutive frames containing the initial frame of moving picture. Therefore, the encoder 100 is provided with the information amount reduction unit 103 to avoid an increased amount of information about data to be transmitted when the transmission of image data is started.

Upon receipt of the output data from the orthogonal transform unit 501, the information amount reduction unit 103 reduces the amount of information about the data as necessary. Practically, the information amount reduction unit 103 reduces the amount of information about data before receiving a notification from the frame number count unit 101, and stops the process of reducing the amount of information about data after receiving the notification. That is, the information amount reduction unit 103 reduces the amount of information about output data only for the number of predetermined consecutive frames containing the first frame of moving picture.

The data input to the information amount reduction unit 103 is image data (or predicted image error data). The information amount reduction unit 103 reduces the amount of information about the input data by lowering the spatial resolution of the image. The method of lowering the spatial resolution of an image is described later.

The information amount adjustment unit 104 adjusts the amount of information about data to be output according to the notification from the frame number count unit 101. Practically, the information amount adjustment unit 104 does not function before it receives a notification from the frame number count unit 101, but stepwise increases the amount of information about data to be output from the state in which the amount of information is reduced by the information amount reduction unit 103 after receiving the notification. The information amount adjustment unit 104 adjusts the amount of information about data by changing the spatial resolution of an image.

Described below is the operation of the encoder 100. The encoder 100 receives moving picture data for each frame. The encoder 100 codes image data for each block obtained by dividing an image of each frame into a plurality of blocks. The operation is described in the following order (1) through (3), where 1<N<M.
(1) First through (N−1)th frame: forcible intra-frame coding process and low resolution
(2) N-th through M-th frame: intra-frame/inter-frame adaptive coding process, and stepwise increase of resolution
(3) M-th and following frames: intra-frame/inter-frame adaptive coding process When the image data in the first frame of the moving picture data is input, the selection unit 102 selects and outputs '0'. As a result, the prediction error signal generation unit 510 provides the input image data as is for the orthogonal transform unit 501. That is, for the image data in the first frame, the intra-frame coding process is performed by the orthogonal transform unit 501 and the quantization unit 502.

In this coding process, the information amount reduction unit 103 reduces the amount of information about the data received from the orthogonal transform unit 501 by lowering the spatial resolution of an image. At this time, the information amount adjustment unit 104 does not function.

The inverse quantization unit 503, the inverse orthogonal transform unit 504, and the decoded image generation unit 505 generates a decoded image to be obtained by the reception device. The decoded image is stored in the decoded image storage unit 506. That is, the decoded image in the first frame is stored in the decoded image storage unit 506.

When the image data in the second frame is input, the selection unit 102 selects and outputs '0' as in the case where the image data in the first frame is input. As a result, the intra-frame coding process is performed on the image data in the second frame by the orthogonal transform unit 501 and the quantization unit 502. In addition, the information amount reduction unit 103 reduces the amount of information about given data as in the case where the image data in the first frame is input.

When the image data in the second frame is input, the prediction parameter computation unit 507 computes the parameter (containing a motion vector) for prediction of a target image from the past image. Practically, the prediction parameter computation unit 507 computes a prediction parameter by comparing the decoded image in the first frame stored in the decoded image storage unit 506 with the newly input image in the second frame. The computation result is provided for the predicted image generation unit 508 and the selection unit 509, and is transmitted to the decoder.

The predicted image generation unit 508 generates a predicted image in the second frame based on the decoded image in the first frame stored in the decoded image storage unit 506 and the prediction parameter provided from the prediction parameter computation unit 507. Then, the selection unit 509 selects and outputs the predicted image generation unit 508 or '0' based on the prediction parameter provided by the prediction parameter computation unit 507. However, when the image data in the second frame is input, the selection unit 102 selects '0', thereby discarding the output of the selection unit 509 without using the output.

Afterwards, the encoder 100 performs the process similar to the process performed when the image data in the second frame is input each time the image data in the third through the (N−1)th frames is input. That is, the intra-frame coding process is performed on the image data in the first through the (N−1)th. At this time, the amount of information about data to be coded is reduced.

When the image data in the N-th frame is input, the frame number count unit 101 notifies the selection unit 102, the information amount reduction unit 103, and the information amount adjustment unit 104 of the input.

Upon receipt of the notification from the frame number count unit 101, the selection unit 102 selects the output of the selection unit 509. That is, when the image data in the N-th or subsequent frame is a input, the predicted image generated by the predicted image generation unit 508 or '0' is adaptively selected and provided for the prediction error signal generation unit 510. The method of generating a predicted image is the same as the method used when the image data in the first through the (N−1)th frames is input.

When '0' is input, the prediction error signal generation unit 510 outputs an input image as is. In this case, the orthogonal transform unit 501 and the quantization unit 502 perform the intra-frame coding process on the image data as on the image data in the first through the (N−1)th frames. On the other hand, when a predicted image generated by the predicted image generation unit 508 is input, the prediction error signal generation unit 510 outputs an error between the input image and the predicted image. In this case, the orthogonal transform unit 501 and the quantization unit 502 perform the inter-frame coding process on the image data. Thus, when the image data in the N-th and the subsequent frames is input, the image data is coded in the method adaptively determined according to the prediction parameter computed by the prediction parameter computation unit 507.

Figure 6:
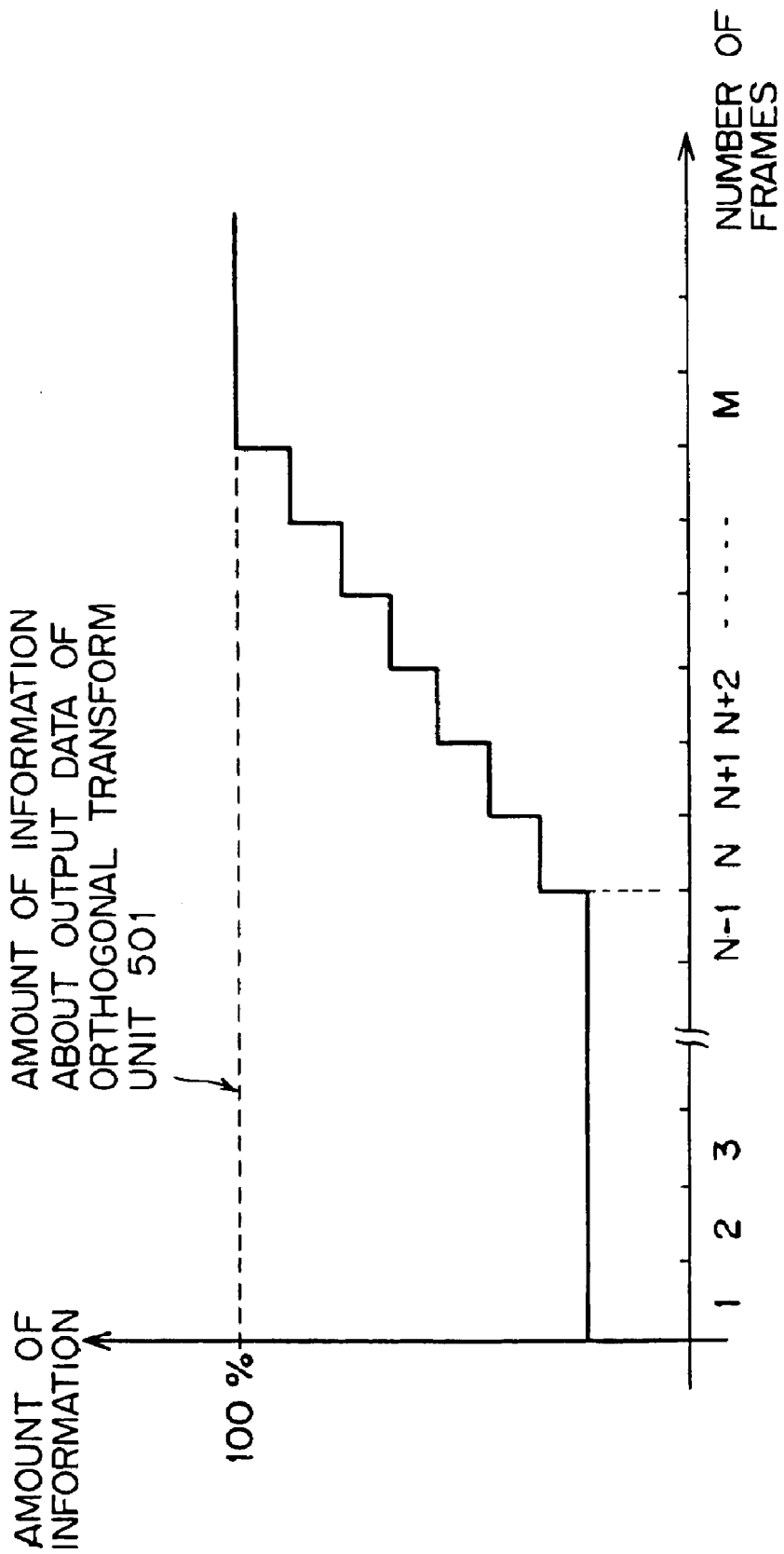
FIG. 6 shows an operation of the information amount adjustment unit.

Upon receipt of the notification from the frame number count unit 101, the information amount reduction unit 103 stops the process of reducing the amount of information abut data. On the other hand, upon receipt of the notification, the information amount adjustment unit 104 stepwise increases the amount of information about the data to be provided for the quantization unit 502 from the amount of information reduced by the information amount reduction unit 103 to the amount of information about the output data of the orthogonal transform unit 501 until the M-th frame is input as shown in FIG. 6.

Thus, the encoder 100 performs the intra-frame coding process on the image data in the first through the (N-1)th frames of moving picture, and performs the adaptive coding process on the image data in the subsequent frames. The encoder 100 then outputs the coded data coded in the above described method, the information about the coding method (intra-frame coding process/inter-frame coding process), and a prediction parameter for each frame. The method of generating and transmitting the information about the coding method and the prediction parameter belongs to the conventional technology. Therefore, the detailed explanation is omitted here.

Figure 7:
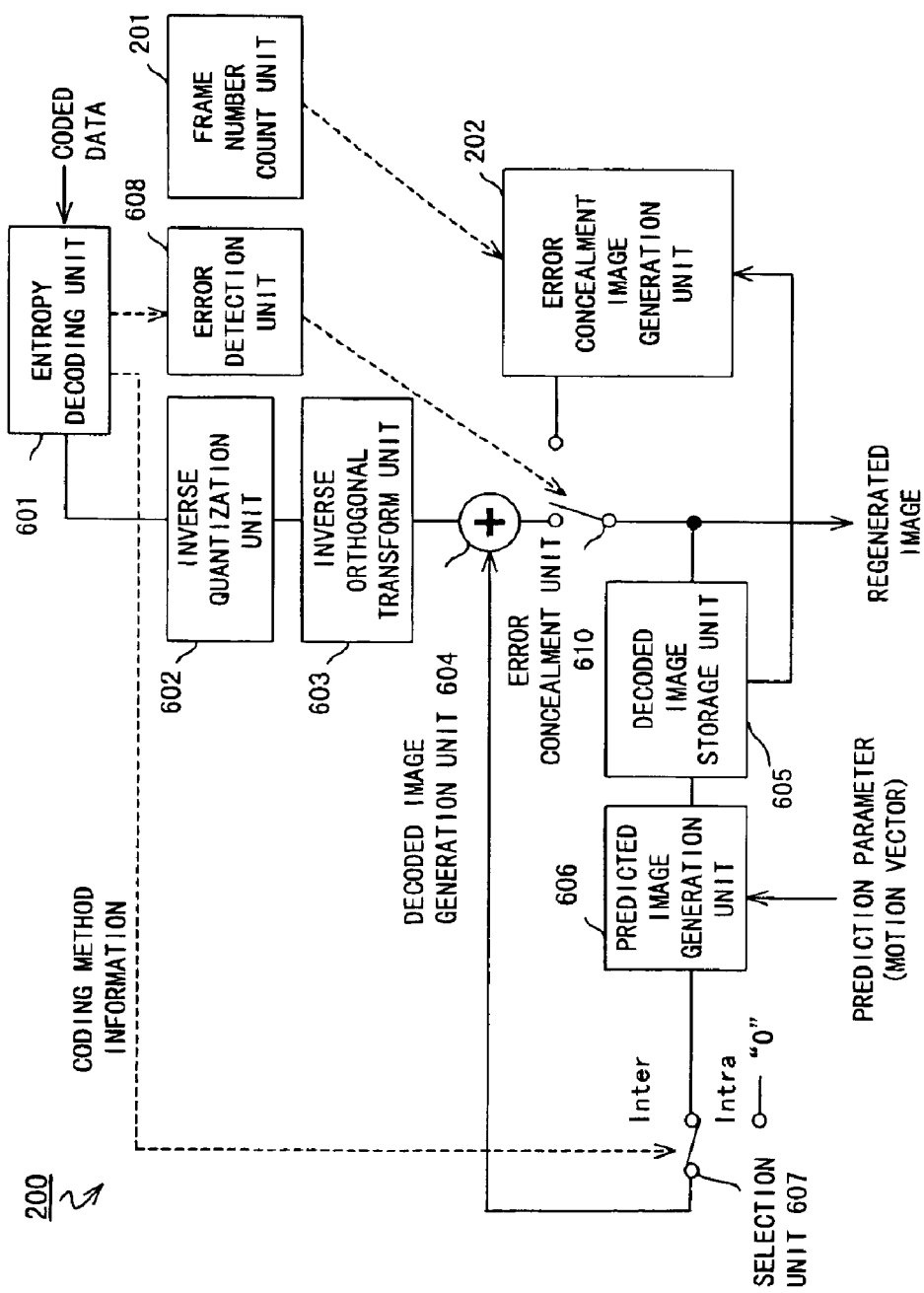
FIG. 7 is a block diagram of the decoder for decoding the data coded by the encoder shown in FIG. 5.

FIG. 7 is a block diagram of the decoder for decoding the data coded by the encoder shown in FIG. 5. The unit numbers shown in both FIGS. 7 and 2 indicate identical units.

Figure 2:
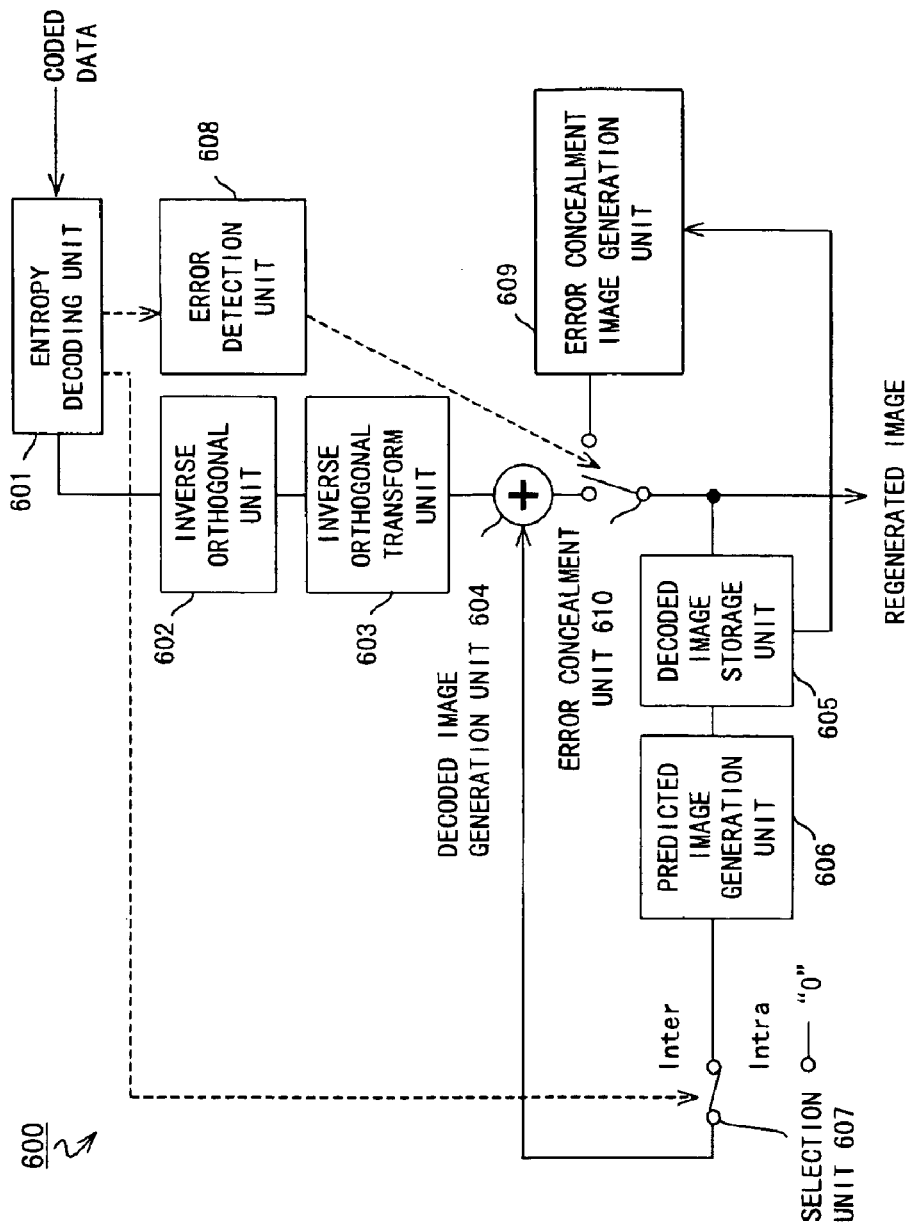
FIG. 2 is a block diagram of the conventional decoder for decoding the moving picture data coded by the encoder shown in FIG. 1.
Figure 3:
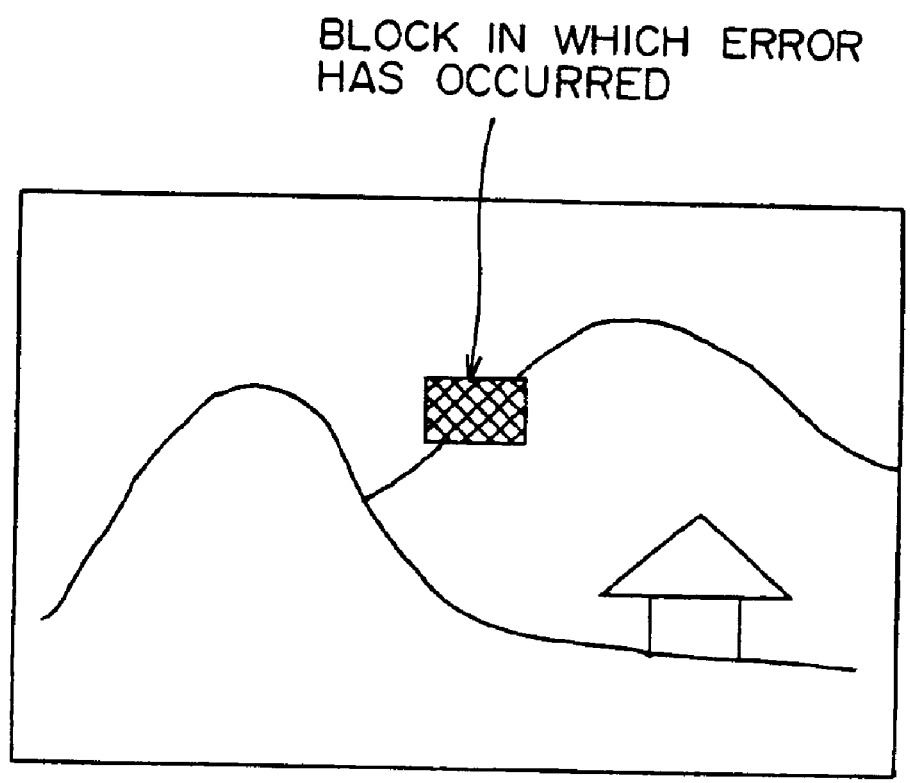
FIG. 3 shows the problem with the conventional technology.

A decoder 200 is realized by providing a frame number count unit 201 for the decoder 600 shown in FIG. 2, and replacing the error concealment image generation unit 609 provided in the decoder 600 with an error concealment image generation unit 202.

The frame number count unit 201 counts the number of frames to be decoded by the decoder 200. Practically, the frame number count unit 201 counts frames starting with the first frame of moving picture. When the count value reaches a predetermined value, it notifies the error concealment image generation unit 202 of the count result.

According to the notification from the frame number count unit 201, the error concealment image generation unit 202 extracts an error concealment image from the decoded image storage unit 605 for each block when an error is detected, and provides it for the error concealment unit 610. The error detection unit 608 detects a transmission error for each block or in plural block units as a coding unit. The error detecting method can be based on an existing technology.

According to an embodiment of the present invention, the frame number count unit 201 issues a notification to the error concealment image generation unit 202 when the image data in the second frame is input. Before receiving the notification, the error concealment image generation unit 202 extracts, for each block, image data in one or more blocks in the frame containing a target block and adjacent to the target block from the decoded image storage unit 605, and generates an error concealment image based on the extracted image data. After receiving the notification, the error concealment image generation unit 202 extracts, for each block, image data in one or more blocks in the frame before the frame containing a target block and at the same position in a frame as the target block or in the vicinity of the position of the target block, and outputs the extracted image data as an error concealment image. The error concealment unit 610 conceals an error using an image provided by the error concealment image generation unit 202.

Described below is the operation of the decoder 200 with the above described configuration. The information about coded data and a coding method (hereinafter referred to as coding method information) and a prediction parameter are input to the decoder 200. The decoder 200 decodes the coded data for each block using the coding method information and the prediction parameter.

When the image data in the first frame of moving picture is input, the entropy decoding process, the inverse quantizing process, and the inverse orthogonal transforming process are performed on the coded data, and the processed data is provided for the decoded image generation unit 604. In addition, the coding method information about the first frame is provided for the selection unit 607. Here, the intra-frame coding process is performed by the encoder 100 on the image data in the first frame. In this case, the selection unit 607 selects '0' and provides it for the decoded image generation unit 604. Therefore, the decoded image generation unit 604 outputs the transform result obtained by the decoded image generation unit 604 as a regenerated image, and stores the image in the decoded image storage unit 605.

The operation performed when the image data in the second through the (N-1)th frames is input is the same as the operation performed when the image data in the first frame is input. That is, since the intra-frame coding process is performed by the encoder 100 on the image data in the second through the (N-1)th frame, the selection unit 607 selects '0' and provides it for the decoded image generation unit 604. Therefore, the decoded image generation unit 604 generates the image in the corresponding frame without an influence of the past image.

The image data in the N-th frame or subsequent frames is coded in the coding method adaptively selected by the encoder 100. The decoder 200 is informed which coding method is used by the encoder 100 according to the coding method information.

The selection unit 607 selects '0' when the coding method information indicates the intra-frame coding process as in the case where the image data in the first through the (N-1)th frame is input. On the other hand, when the coding method information indicates the inter-frame coding process, the selection unit 607 selects a predicted image generated by the predicted image generation unit 606. The predicted image is generated based on the decoded image in the previous frame stored in the decoded image storage unit 605 and the prediction parameter provided by the encoder 100.

When the selection unit 607 selects a predicted image, the decoded image generation unit 604 generates a regenerated image by combining the output of the inverse orthogonal transform unit 603 with the predicted image.

Described below is the error concealing operation when an error occurs. The error concealment image generation unit 202 generates an image for concealment of an error for each block, and provides it for the error concealment unit 610.

When the first frame of moving picture is input, the error concealment image generation unit 202 first extracts the image data in one or more blocks adjacent to a target block in the frame containing the target block from the decoded image storage unit 605. For example, as shown in FIG. 8, when a block B43 is a target block, the error concealment image generation unit 202 extracts the image data in the blocks B33, B34, and B42 from the decoded image storage unit 605. The image data is coded/decoded in the order of blocks B11, B12, B13, . . . , B21, B22, B23, and so forth. That is, when the block B43 is decoded, the blocks B11 thorough B42 have already been decoded and stored in the decoded image storage unit 605. The error concealment image generation unit 202 generates an error concealment image for a target block based on the extracted image data in one or more blocks.

When an error is detected by the error detection unit 608, a block containing the error is reported to the error concealment unit 610. Upon receipt of report, the error concealment unit 610 replaces the image data generated by the decoded image generation unit 604 with an error concealment image generated by the error concealment image generation unit 202. Thus, the error in the target block is concealed.

On the other hand, when the second or the subsequent frames of the moving picture are input, the error concealment image generation unit 202 extracts, for each block, the image data in the block, in the frame precedent to the frame containing the target block, at the same position in the frame as the target block (or in the vicinal blocks). For example, as shown in FIG. 9, when the block B43 is a target block, the error concealment image generation unit 202 extracts the image data in the block B43 in the previous frame stored in the decoded image storage unit 605. When an error is detected by the error detection unit 608, the error concealment unit 610 replaces the image data generated by the decoded image generation unit 604 with the error concealment image generated by the error concealment image generation unit 202.

As described above, when an error is detected in the first frame, the decoder according to an embodiment of the present invention conceals the error using the image data in another block in the first frame, and conceals an error using the image data in the previous frame when the error is detected in the subsequent frames.

Figure 10:
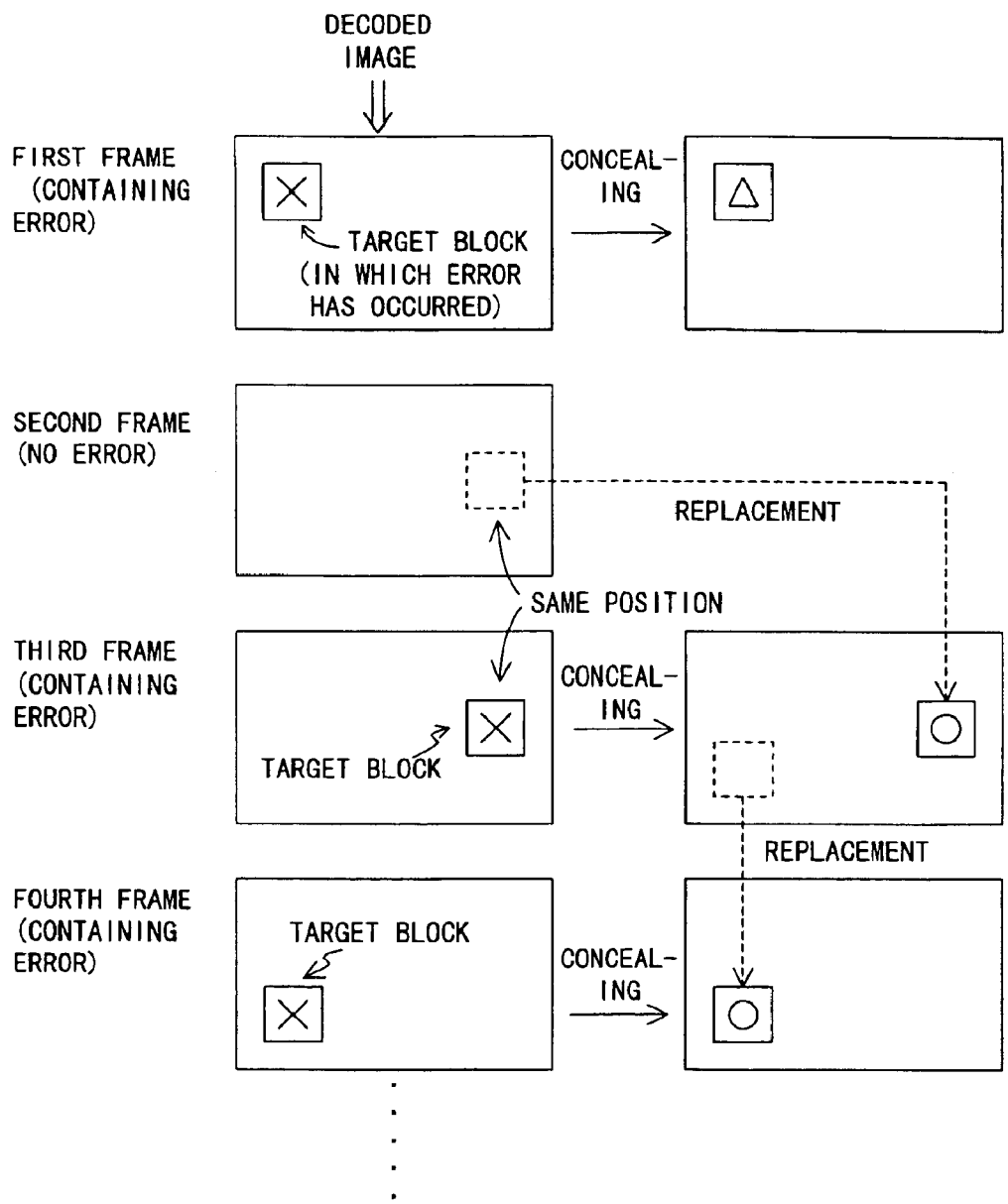
FIG. 10 shows the effect according to an embodiment of the present invention.

FIG. 10 shows the effect of an embodiment of the present invention. In this example, it is assumed that the communications environment is not good, and errors frequently occur.

When an error occurs in the first frame, the error is concealed by the error concealment unit 610. However, since the error occurring in the first frame is concealed using the image data in another block in the same frame, there is a possibility that an image in the target block is not serial with images in surrounding blocks.

Then, the second frame is decoded. In this step, it is assumed that no errors have occurred in the second frame.

Since the intra-frame coding process is performed on the image data in the second frame, the decoded image in the second frame is not affected by the past frames. That is, there arises no influence of an error occurring in the first frame on the decoded image in the second frame.

Then, the third frame is decoded. In this step, it is assumed that an error has occurred in the third frame.

In this case, the error concealment unit 610 extracts the image data in the corresponding block in the second frame, and replaces the image data in the block in which an error has been detected in the third frame with the extracted image data. If the image in the second frame is similar to the image in the third frame, then the image in the target block which would be obtained if an error did not occur in the third frame should be similar to the corresponding image extracted from the decoded image storage unit 605. Therefore, in this case, after the concealing process, the image in the third frame is good without an erroneous condition. The decoded image storage unit 605 stores the image with the error concealed.

Afterwards, the fourth frame is decoded. In this step, it is assumed that an error has occurred in the fourth frame.

In this case, the error concealment unit 610 conceals the error using the image data in the corresponding block in the third frame. Here, the image in the third frame stored in the decoded image storage unit 605 contains the influence of the error. However, if the block in which the error has occurred in the third frame is different from the block in which the error has occurred in the fourth frame, then the image for concealment of the error occurring in the fourth frame does not contain the influence of the error. Therefore, after the error concealing process, the image in the fourth frame is as good as the image in the third frame without any erroneous condition.

If errors continuously occur in the blocks at the same positions in the consecutive frames, the influence of the errors is propagated to the subsequent frames. However, there is the smallest possibility that such an erroneous condition occurs.

As describe above, in the system including the encoder and the decoder according to an embodiment of the present invention, the intra-frame coding process is performed on a plurality of consecutive frames containing the first frame of moving picture, and the image in the previous frame is used in the error concealing process on the second and subsequent frames in the decoder. As a result, although an error has occurred in the first frame, the error can be sufficiently concealed, and the influence of the error is not propagated to the subsequent frames.

Figure 11:
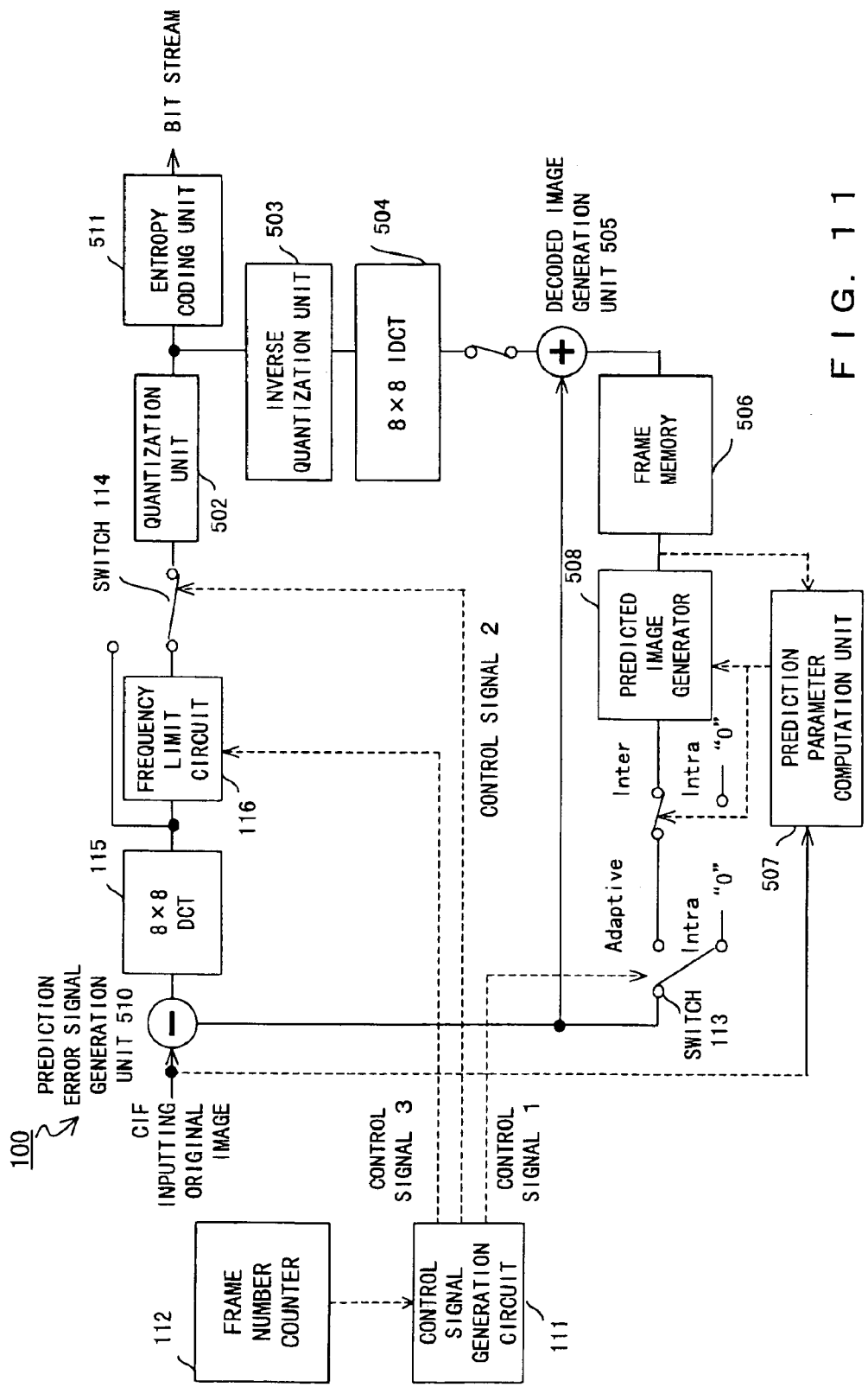
FIG. 11 shows a practical example of the encoder according to an embodiment of the present invention.

FIG. 11 shows a practical example of the encoder according to an embodiment of the present invention. An input image is in a CIF (common intermediate format). Since the configuration and the operation of the conventional technology have been already described above, they are omitted here.

A control signal generation circuit 111 generates control signals 1 through 3 shown in FIG. 12 according to the number of frames counted by a frame number counter 112. That is, the control signal generation circuit 111 generates an 'intra-frame' signal as a control signal 1 for each of the first through the (N−1)th frames, and generates an 'adaptive' signal for the subsequent frames. The control signal 1 indicates which is to be performed, the intra-frame coding process or the adaptive coding process. The control signal generation circuit 111 generates an 'limited' signal as a control signal 2 for each of the first through the M-th frames, and generates a 'no limit' signal for the subsequent frames. The control signal 2 indicates whether or not the AC element is limited for the output of the DCT. Furthermore, the control signal generation circuit 111 generates a '1' signal as a control signal 3 for each of the first through the N-th frames, and sequentially generates '2' through '8' signals for each of the (N+1)th through the M-th frames. The control signal 3 is effective only when the control signal 2 is 'limited', and indicates the range of the frequency elements to be transmitted.

Figure 13:
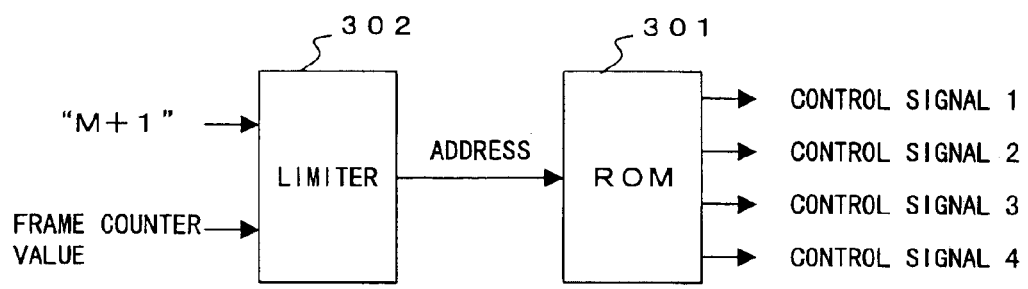
FIG. 13 shows an embodiment of the control circuit.
Figure 14:
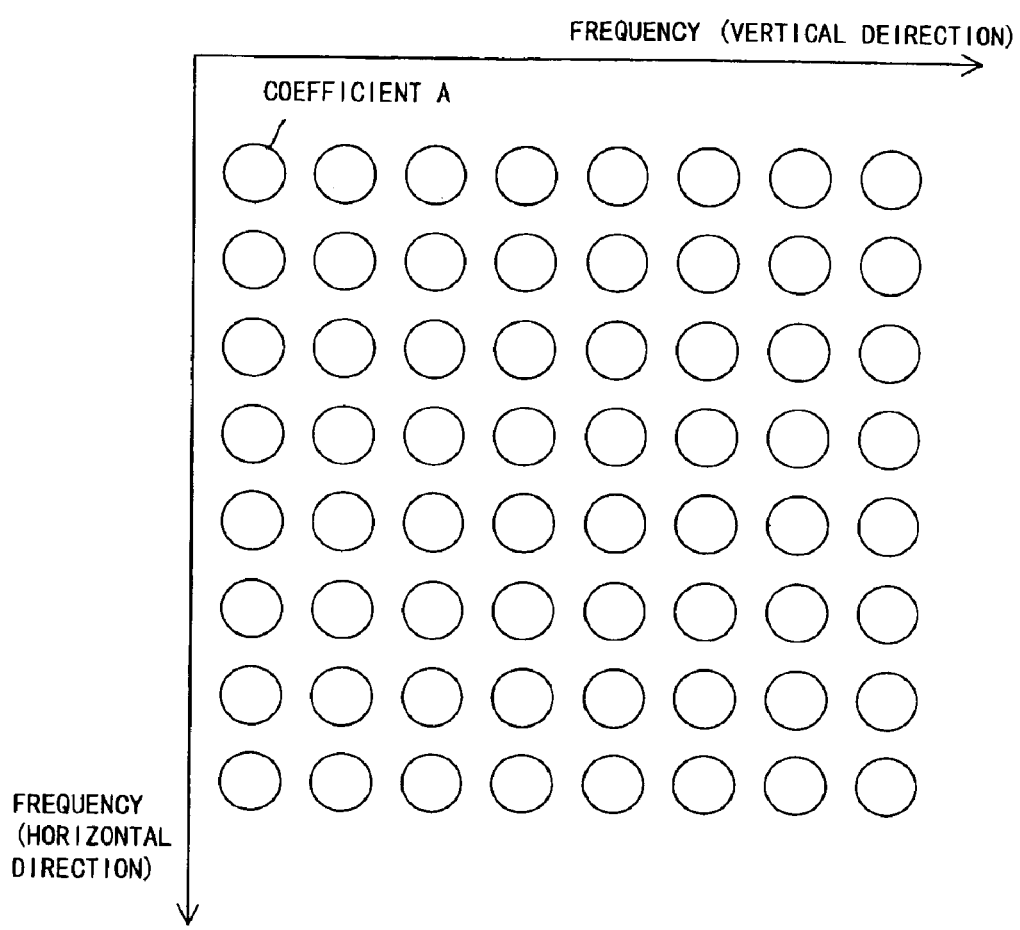
FIG. 14 shows the output of a DCT.

FIG. 13 shows an embodiment of the control signal generation circuit 111. Memory (ROM) 301 stores the information shown in FIG. 12. The control signals 1 through 3 are 1-bit or plural-bit information, and are stored using addresses as keys uniquely determined for the count value of the frame number counter 112.

In addition, when the count value is larger than M+1, the control signals 1 through 3 are the same as those in the case where the count value is 'M+1'. Therefore, a limiter 302 is provided, and when the count value is larger than 'M+1', the value is transformed into 'M+1'.

Back in FIG. 11, a switch 113 selects '0' or predicted image according to the control signal 1. That is, the switch 113 selects '0' when the control signal 1 indicates 'intra-frame', and selects a predicted image when the signal indicates 'adaptive'. When the switch 113 selects '0', the intra-frame coding process is performed, and when it selects a predicted image, the adaptive coding process is performed. This method is basically the same as the method described above by referring to FIG. 5.

A switch 114 selects an output of a DCT 115 or an output of a frequency limit circuit 116 according to the control signal 2. That is, the switch 114 selects an output of the frequency limit circuit 116 when the control signal 2 indicates 'limited', and selects an output of the DCT 115 when the signal indicates 'no limit'.

The DCT 115 performs a DCT operation on 8×8 pixel image data. The output of the DCT 115 comprises a coefficient obtained for each frequency element. As it is well-known, a coefficient A is a coefficient of a direct current element.

The frequency limit circuit 116 corresponds to the information amount reduction unit 103 and the information amount adjustment unit 104 shown in FIG. 5, and removes a predetermined frequency element from the output of the DCT 115 according to the control signal 3.

Figure 15:
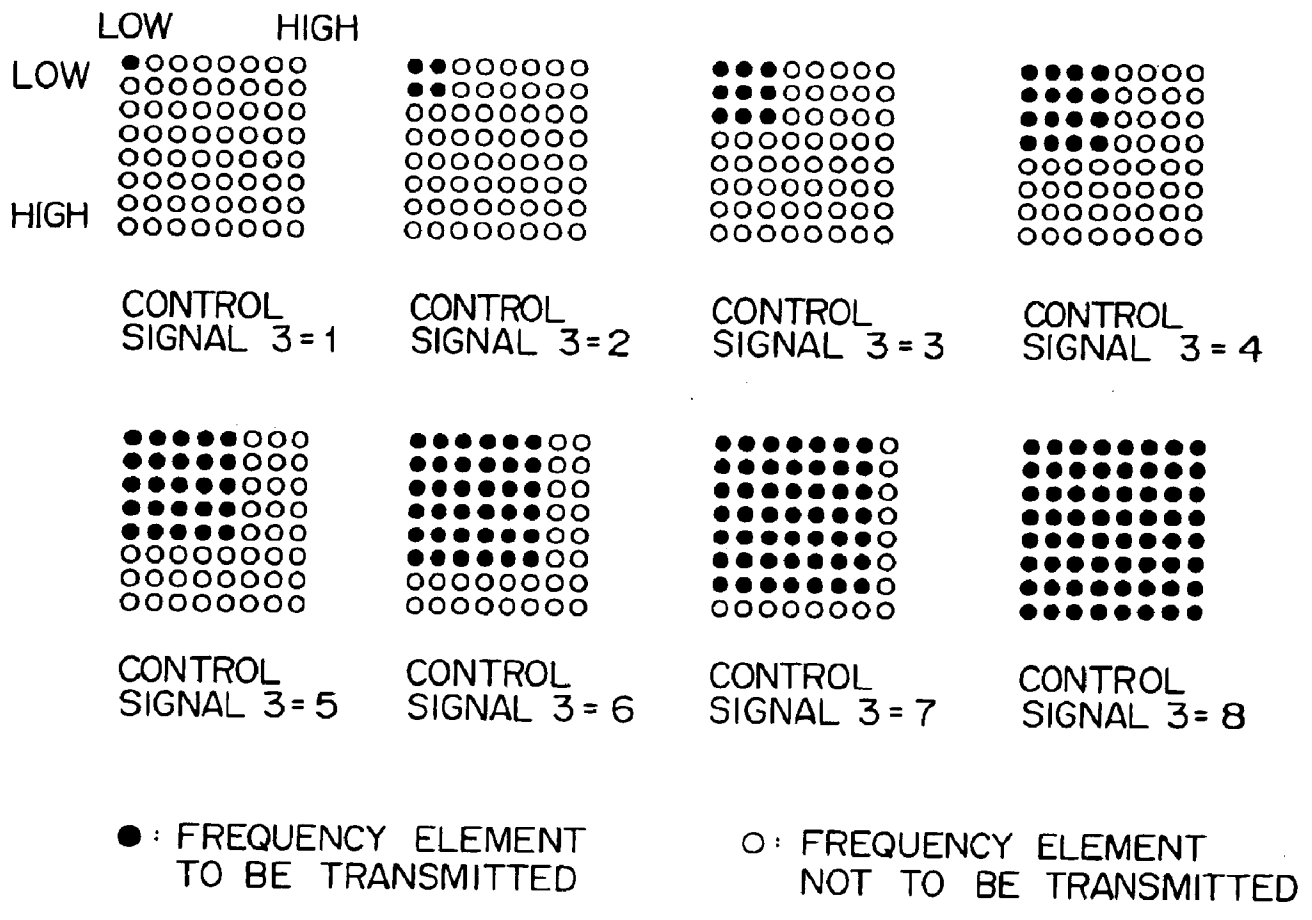

FIG. 15 shows the operation of the frequency limit circuit 116. In this step, a frequency element to be transmitted is indicated by a mark "●, and a frequency element not to be transmitted is indicated by a mark "0".

When the control signal 3 indicates '1', the frequency limit circuit 116 outputs only a coefficient of a direct current element in the coefficients obtained from the DCT 115. In this case, the coefficients other than the direct current element can be replaced with, for example, '0'. If the control signal 3 indicates '2', the frequency limit circuit 116 outputs only four coefficients of lower frequencies in the coefficients obtained from the DCT 115. Similarly, the frequency limit circuit 116 sequentially outputs a predetermined number of coefficients in order from the lowest frequency. In this case, a coefficient which is not output is replaced with '0'.

Figures 16A, 16B:
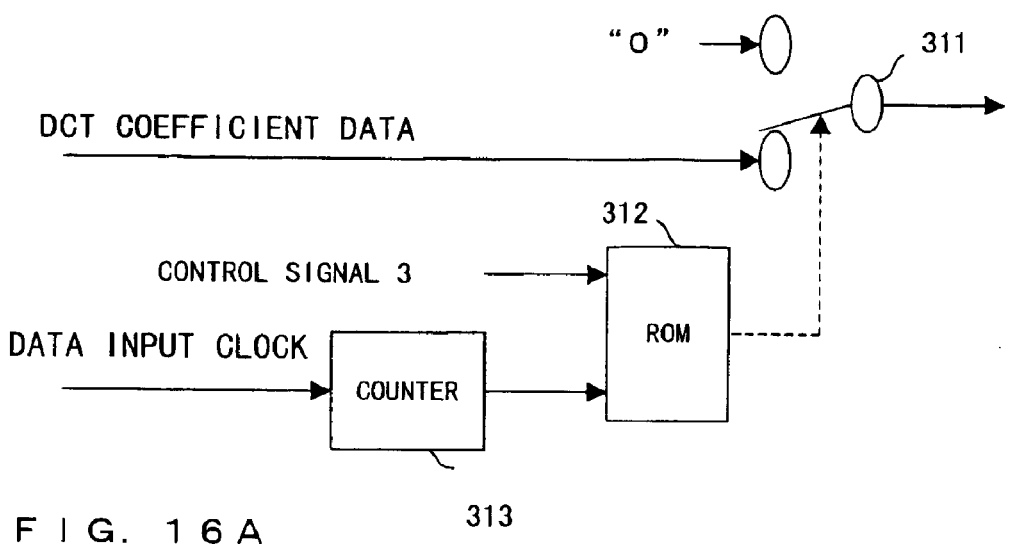
FIG. 16A shows an example of the method of realizing the frequency limit circuit.
FIG. 16B shows the order of scanning the 8×8 DCT coefficients.

FIG. 16A shows an example of a method for realizing a frequency limit circuit. The 8×8 DCT coefficients are input in the order shown in FIG. 16B and provided for a switch 311. The switch 311 is controlled according to the information stored in memory (ROM) 312.

The memory 312 stores the information for realizing each operation shown in FIG. 15 using the value (1 through 8) of the control signal 3 as a key. For example, the memory 312 stores '1000 . . .' for transmission of only the coefficients of direct current elements for 'the control signal 3=1'. In addition, for the 'control signal 3=2', the memory 312 stores '11101000 . . .' for transmission of only the coefficients represented as '0', '1', '2', and '4' shown in FIG. 16B. Thus, the memory 312 stores the information indicating whether or not each of 64 coefficients is to be transmitted. A counter 313 generates a signal for sequentially reading information in a bit unit from the memory 312, when the control signal 3 is received.

The switch 311 selects coefficient data of the DCT when it receives '1' from the memory 312, and selects '0' when it receives '0'. Thus, only predetermined coefficients are transmitted, and the other coefficients are replaced with '0'.

Described below is the operation of the encoder. During the period in which the count value of the frame number counter 112 is 1 through N−1, the control signal 1 indicates 'intra-frame'. In addition, the control signal 2 indicates 'limited', and the control signal 3 indicates '1'. Therefore, the intra-frame coding process is forcibly performed on the first N−1 consecutive frames immediately after the start of the communications. In addition, the spatial resolution of an image is lowered by transmitting only the direct current elements DCT coefficients.

In the period in which the count value of the frame number counter 112 is N through M, the control signal 1 is switched into 'adaptive', the adaptive coding process is performed. On the other hand, the control signal 2 remains 'limited', and the control signal 3 increases by 1 for each of the frames '2' through '8'. Therefore, the higher limit of the frequency of the AC element of a DCT coefficient stepwise increases.

Thus, the encoder according to an embodiment of the present invention performs the intra-frame coding process on a plurality of consecutive frames containing the first frame of moving picture. This causes the amount of information about data to be transmitted to be increased. However, since the AC elements of an output of the DCT is removed for the above described plural frames, and only the direct current element is transmitted, the amount of information of the data to be transmitted is reduced. That is, although the intra-frame coding process is performed on a plurality of consecutive frames containing the first frame, the amount of information about the data to be actually transmitted does not increase. Therefore, no transmission delay is caused by introducing the method according to an embodiment of the present invention.

When an image data coding method is switched from a forcible intra-frame coding process to an adaptive coding process, the resolution of an image is stepwise raised, thereby smoothly changing a regenerated image.

FIG. 17 shows a practical embodiment of the decoder according to an embodiment of the present invention. Since the configuration and the operation of the conventional technology have been described above by referring to FIG. 7, the detailed explanation is omitted here.

The decoder 200 decodes the data coded by the encoder 100. The amount of information about the image data in a predetermined number of consecutive frames containing the first frame is reduced as shown in FIG. 15. That is, the decoder 200 decodes the coded data whose amount of information has been reduced by the frequency limit circuit 116.

However, the format of the coded data whose amount of information has been reduced by the frequency limit circuit 116 is the same as the format of common image data although the spatial resolution of an image is lower. Therefore, the decoder 200 can decode the image data in the same method as for common image data. In other words, the decoder 200 can decode the data encoded by the encoder 100 without providing new function with the conventional decoder.

A control signal generation circuit 211 generates a control signal shown in FIG. 18 according to the number of frames counted by a frame number counter 212. That is, the control signal generation circuit 211 generates a 'generating a concealment image from the current image' signal as a control signal for the first frame, and generates a 'generating a concealment image from the previous image' signal as a control signal for the subsequent frames. When the control signal indicates 'generating a concealment image from the current image,' a switch 213 selects an image generated by a concealment image generator 214. When the control signal indicates 'generating a concealment image from the previous image,' the switch 213 selects an image generated by a concealment image generator 215.

The concealment image generator 214 generates a concealment image from the image data in the current frame stored in frame memory 216. This method has been described above by referring to FIG. 8. The frame memory 216 corresponds to the decoded image storage unit 605 shown in FIG. 7, and stores an image generated by the decoded image generation unit 604 (or an image obtained after an error has been concealed by the error concealment unit 610). On the other hand, the concealment image generator 215 generates a concealment image from the image data in the previous frame stored in the frame memory 216. The method has already been described above by referring to FIG. 9.

Therefore, when the first frame is input, a concealment image generated from the decoded image in the first frame is provided for the error concealment unit 610. Afterwards, a concealment image generated from the image data in the frame immediately before the current frame is provided for the error concealment unit 610. Then, the error concealment unit 610 conceals an error using the provided concealment image when the error is detected.

FIG. 19 is a block diagram of the encoder according to another embodiment of the present invention. In the encoder shown in FIG. 5, the information amount reduction unit 103 is provided in the stage after the orthogonal transform unit 501. However, in the encoder shown in FIG. 19, an information amount reduction unit 121 is provided in the stage before the orthogonal transform unit 501. By providing the information amount reduction unit 121, an information amount increase unit 122 is provided at the stage after the inverse orthogonal transform unit 504. The information amount reduction unit 121 and the information amount increase unit 122 basically perform opposite processes to each other. The operations of the information amount reduction unit 121 and the information amount increase unit 122 are described later.

Figure 20:
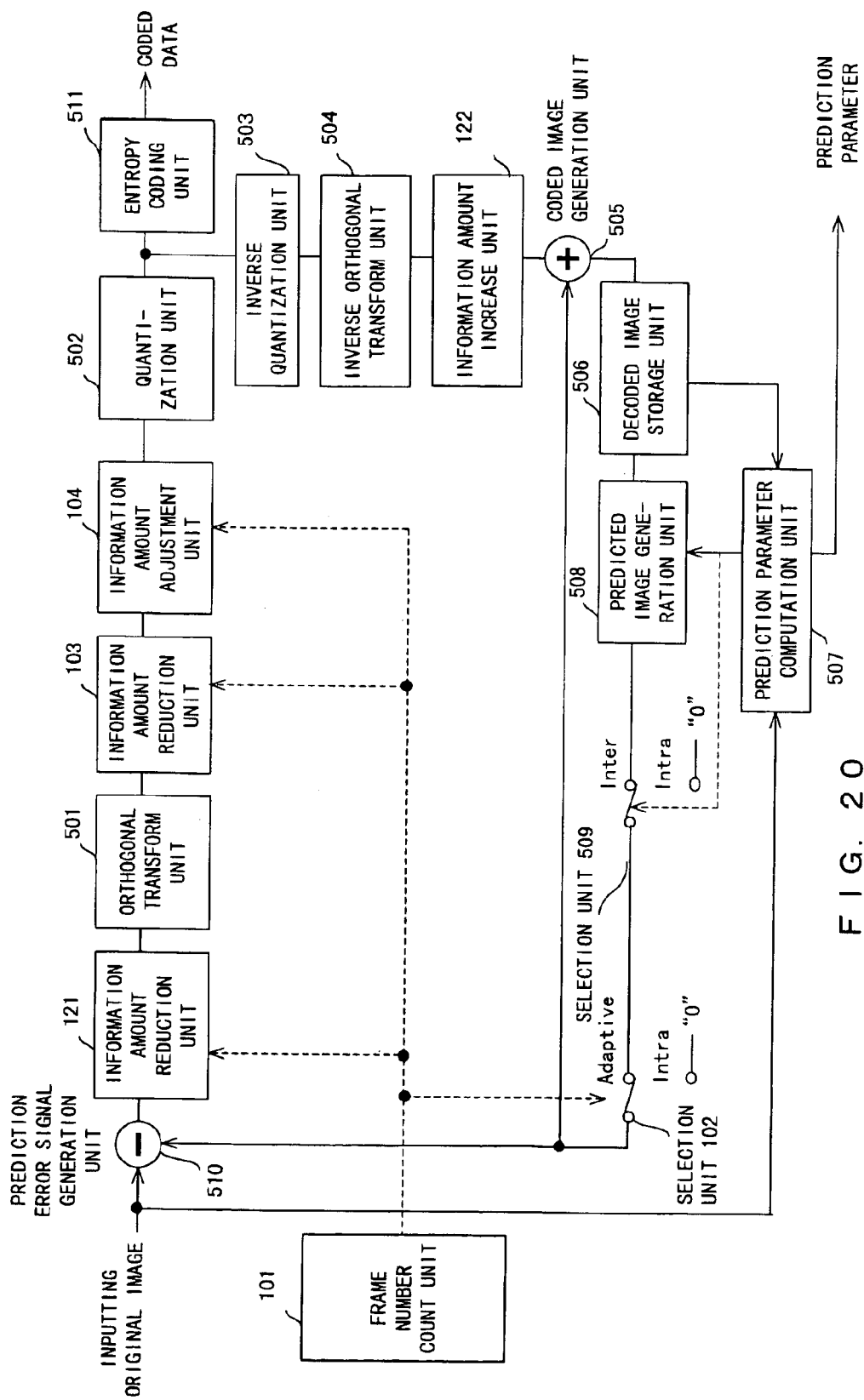
FIG. 20 is a block diagram of the encoder according to another embodiment of the present invention.

FIG. 20 is a block diagram of the encoder according to a further embodiment of the present invention. The encoder has a configuration obtained by combining the configuration shown in FIG. 11 and the configuration shown in FIG. 19, and comprises two information amount reduction units 103 and 121.

Figure 21:
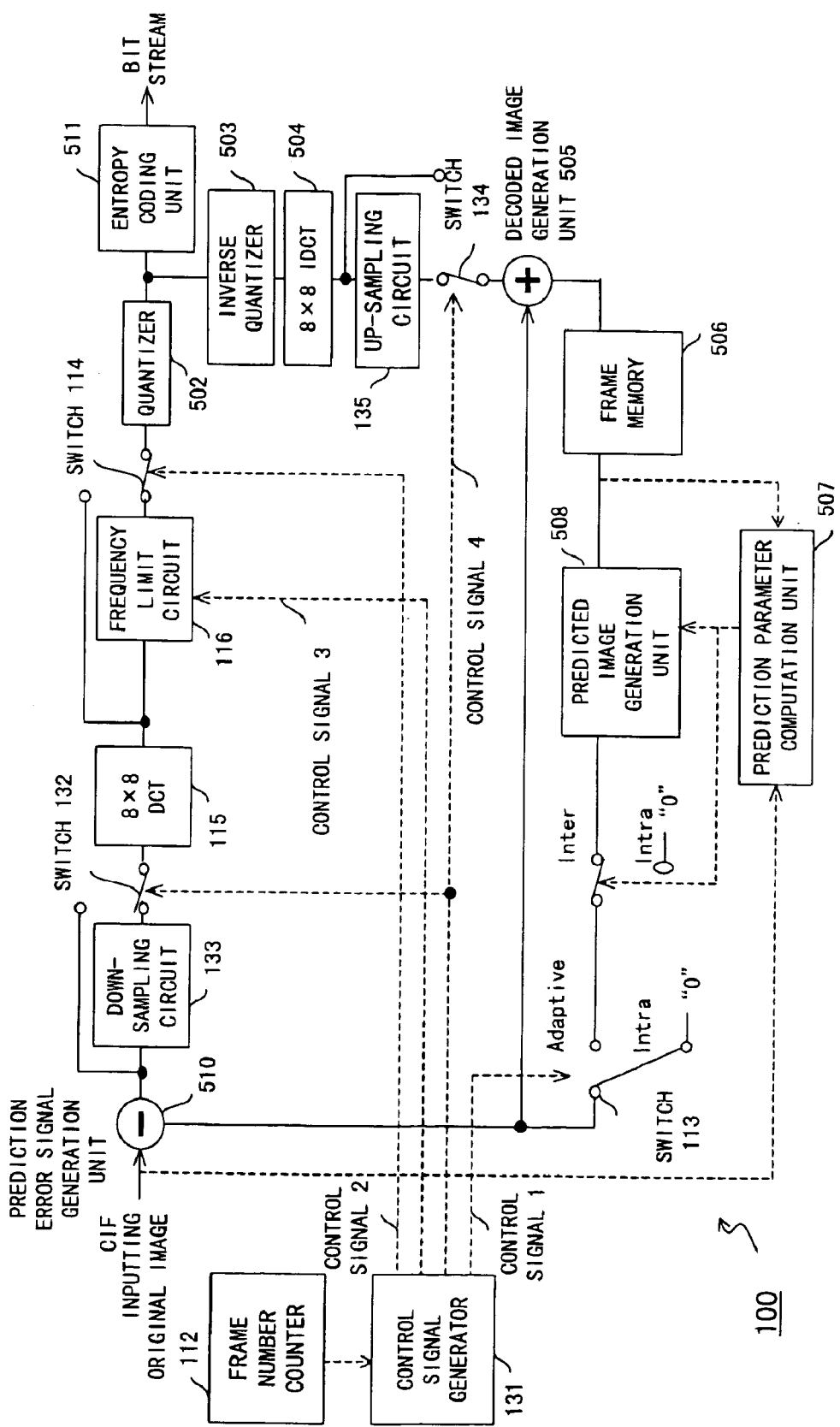
FIG. 21 shows a practical embodiment of the encoder shown in FIG. 19 or FIG. 20.

FIG. 21 shows a practical embodiment of the encoder shown in FIG. 19 or 20. The encoder receives 16×16 pixel image data. Since the configuration and the operation of the conventional technology have been described above by referring to FIG. 5, the detailed explanation is omitted here.

A control signal generator 131 generates control signals 1 through 4 shown in FIG. 22A or 22B according to the number of frames counted by the frame number counter 112. When the control signals shown in FIG. 22A is generated, the encoder shown in FIG. 19 is realized. When the control signals shown in FIG. 22B is generated, the encoder shown in FIG. 20 is realized.

The control signals 1 through 3 are the same as the signals used in the encoder shown in FIG. 11. However, when the encoder shown in FIG. 19 is realized, the control signal 3 is not used for the first through the (N−1)th frames. When the control signal 3 is not used, the frequency limit circuit 116 provides the output of the DCT 115 as is for the quantization unit 502.

The control signal 4 indicates whether or not a down-sampling process and a corresponding up-sampling process are to be performed. The control signal generation 131 generates a 'sampling' signal as the control signal 4 for each of the first through the (N−1)th frames, and generates a 'no sampling' signal for the subsequent frames.

When the control signal 4 indicates 'sampling', a switch 132 selects an output of a down-sampling circuit 133. When the control signal 4 indicates 'no sampling', it selects an output of the prediction error signal generation unit 510. That is, the encoder shown in FIG. 21 performs a down-sampling process on the image data in each of the first through the (N−1)th frames. Similarly, upon receipt of a 'sampling' signal as a control signal 4, the switch 134 selects an output of an up-sampling circuit 135. Upon receipt of a 'no sampling' signal, it selects an output of the IDCT.

16×16 pixel image data-is input to the down-sampling circuit 133. The down-sampling circuit 133 is a low-pass filter, and performs the down-sampling process on the image data. The down-sampling process refers to a process of reducing the number of pixels. In this embodiment, the number of pixels is reduced into half in the horizontal and vertical directions. That is, upon receipt of 16×16 pixel image data, the down-sampling circuit 133 generates 8×8 pixel image data in the down-sampling process, and outputs the data.

FIG. 23 shows the down-sampling process. The down-sampling circuit 133 generates one piece of pixel data from four pieces of input pixel data. The method of generating each piece of pixel data is shown in FIG. 23.

The up-sampling circuit 135 basically performs a process opposite to the process performed by the down-sampling circuit 133. That is, the up-sampling circuit 135 performs an interpolation filter process. Practically, the up-sampling circuit 135 generates 16×16 pixel image data from 8×8 pixel image data.

Thus, the encoder shown in FIG. 21 performs the down-sampling process on the image data in each of the first through the (N−1)th frames so that the spatial resolution of the image can be lowered, when the control signal shown in FIG. 22A is used. Thus, the amount of information about the data to be transmitted is reduced. Since the number of pixels is decreased to ¼ in the above described embodiment, the amount of information about the data to be transmitted is reduced approximately to ¼.

Furthermore, when the control signal shown in FIG. 22B is used, the encoder performs not only the down-sampling process but frequency limitation of a DCT coefficient on the image data in each of the first through the (N−1)th frames. Thus, the amount of information about the data to be transmitted is furthermore decreased in these frames.

The decoder for decoding data coded by the encoder shown in FIG. 21 is realized by, for example, providing the up-sampling circuit 135 at the stage after the IDCT (inverse orthogonal transform unit) 603 in the decoder shown in FIG. 17.

The configuration in the above described embodiment is designed to solve the problem that a good image cannot be obtained in a short time after an error occurs in the first frame of moving picture. However, the similar problem can occur after a scene is switched into another scene in the moving picture. Described below is the moving picture coding system capable of obtaining a good image within a short time after an error occurs immediately after a scene is switched into another scene in the moving picture.

Figure 24:
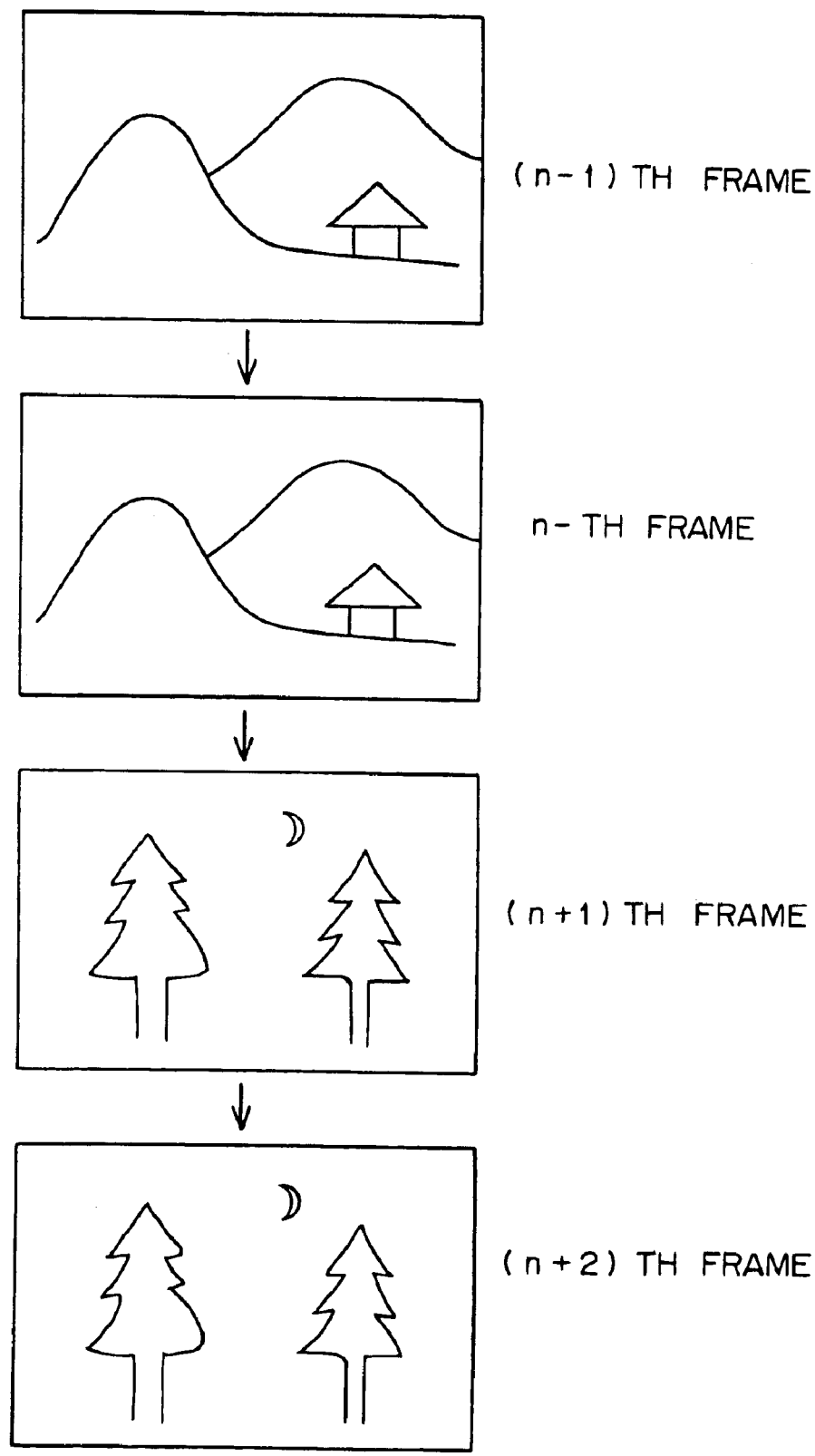
FIG. 24 shows switching of scenes in moving picture.

Moving picture normally contains a plurality of scenes. In each scene, images are smoothly changed continuously. However, when a scene is switched into another scene, the image changes discontinuously. For example, in the example shown in FIG. 24, a scene is switched into another scene between the n-th frame and the (n+1)th frame.

Here, when a transmission error, etc. occurs in a frame, the moving picture decoder conceals the error using the image in the frame immediately before the current frame as described above by referring to FIG. 9 or 10. However, when an error occurs in a frame immediately after a moving picture scene is switched into another scene, the error cannot be concealed using the image in the previous frame. For example, when an error occurs in the (n+1)th frame shown in FIG. 24, the image in the (n+1)th frame is outstandingly deteriorated if the error is concealed using the image in the previous frame (the n-th frame).

Figure 25:
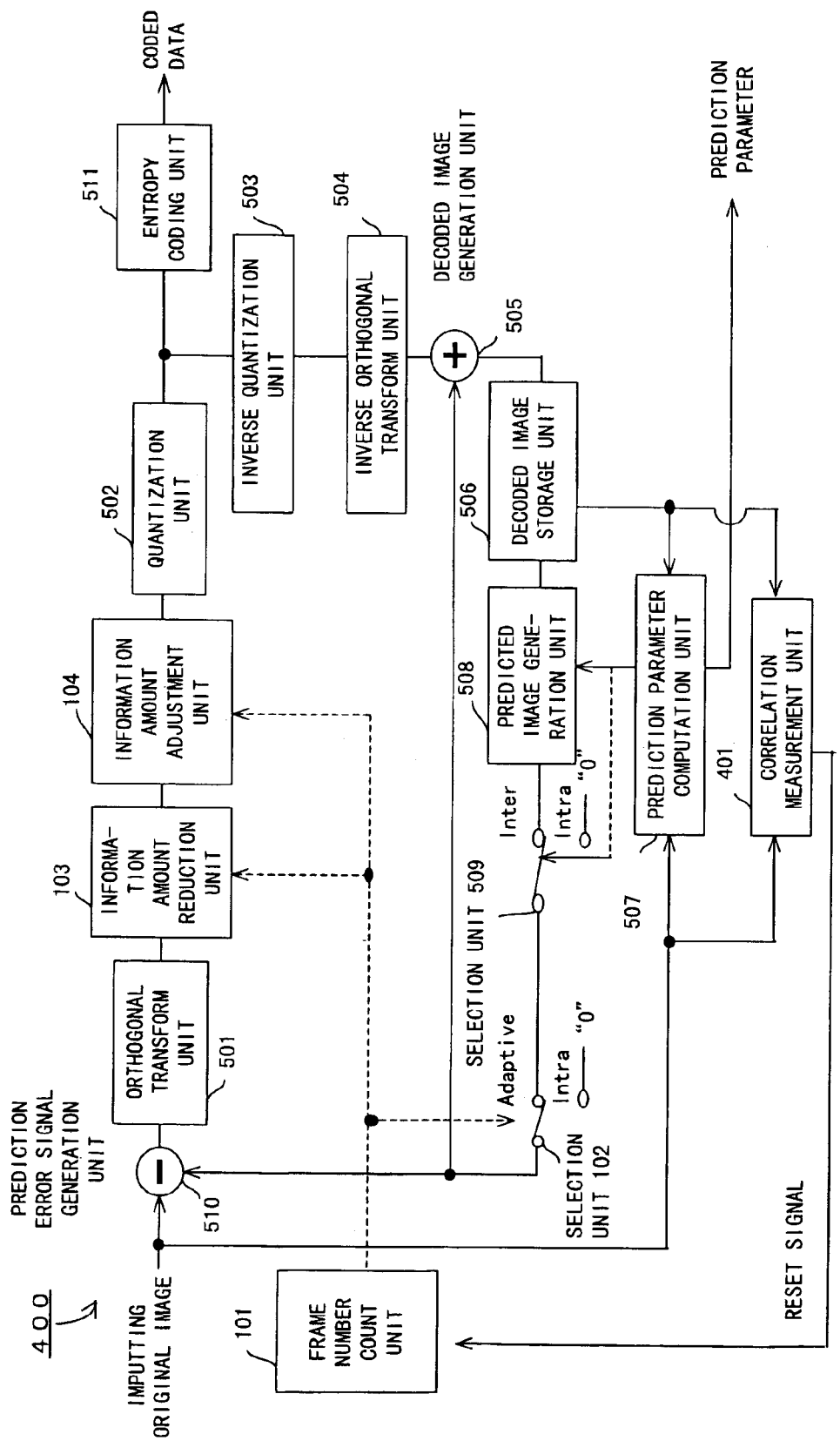
FIG. 25 is a block diagram of the encoder according to another embodiment of the present invention.

FIG. 25 is a block diagram of the encoder for solving the above described problem. An encoder 400 can be realized by providing a correlation measurement unit 401 for the encoder shown in FIG. 5.

The correlation measurement unit 401 detects a discontinuous point in moving picture by checking the correlation between the image in the current frame and the image in the frame immediately before the current frame. That is, the correlation measurement unit 401 determines whether or not a scene of moving picture has been switched into another scene. Here, the image in the target frame is image data to be input to the encoder 400. On the other hand, the image in the frame immediately before the target frame is extracted from the decoded image storage unit 506. When the correlation value between the images of the two frames is smaller than a predetermined value, then the correlation measurement unit 401 assumes that a scene has been switched into another scene in the moving picture, and provides a reset signal for the frame number count unit 101.

The frame number count unit 101 comprises a counter for counting the number of frames to be input to the encoder 400. When a reset signal is received from the correlation measurement unit 401, the counter is reset, and the count value becomes 0. When the count value of the counter becomes 0, the frame number count unit 101 recognizes that the current frame is the first frame. Therefore, when a reset signal is received from the correlation measurement unit 401, the frame number count unit 101 performs an operation similar to the operation performed when the first frame is input to the encoder 100 in FIG. 5. That is, when a reset signal is received from the correlation measurement unit 401, the frame number count unit 101 controls the selection unit 102, the information amount reduction unit 103, and the information amount adjustment unit 104 as in the case where the first frame is input.

The operation of the encoder 100 shown in FIG. 5 is described above. That is, the intra-frame coding process is forcibly performed on the N consecutive frames containing the first frame, and the amount of information about the data to be transmitted is reduced. Then, on the subsequent frames, the intra-frame coding process or the inter-frame coding process is adaptively selected and performed.

Therefore, when a scene in moving picture is switched into another scene in the encoder 400, the intra-frame coding process is forcibly performed on N consecutive frames containing the frame immediately after the frame in which the scene has been switched, and the amount of information about the data to be transmitted is reduced. Then, on the subsequent frames, the intra-frame coding process or the inter-frame coding process is adaptively selected and performed.

Thus, in the encoder 400, the intra-frame coding process is forcibly performed on a plurality of frames containing a frame in which a scene of moving picture has been switched into another scene. Therefore, at least the frame after the frame in which a scene of moving picture has been switched into another scene is coded in the intra-frame coding process. Accordingly, if an error occurs in the frame immediately after the frame in which a scene of moving picture has been switched into another scene, the influence of the error is not propagated to the next frame. That is, the deterioration of the quality of an image caused by the error is not propagated to the subsequent frames, thereby obtaining a good image within a short time.

Figure 26:
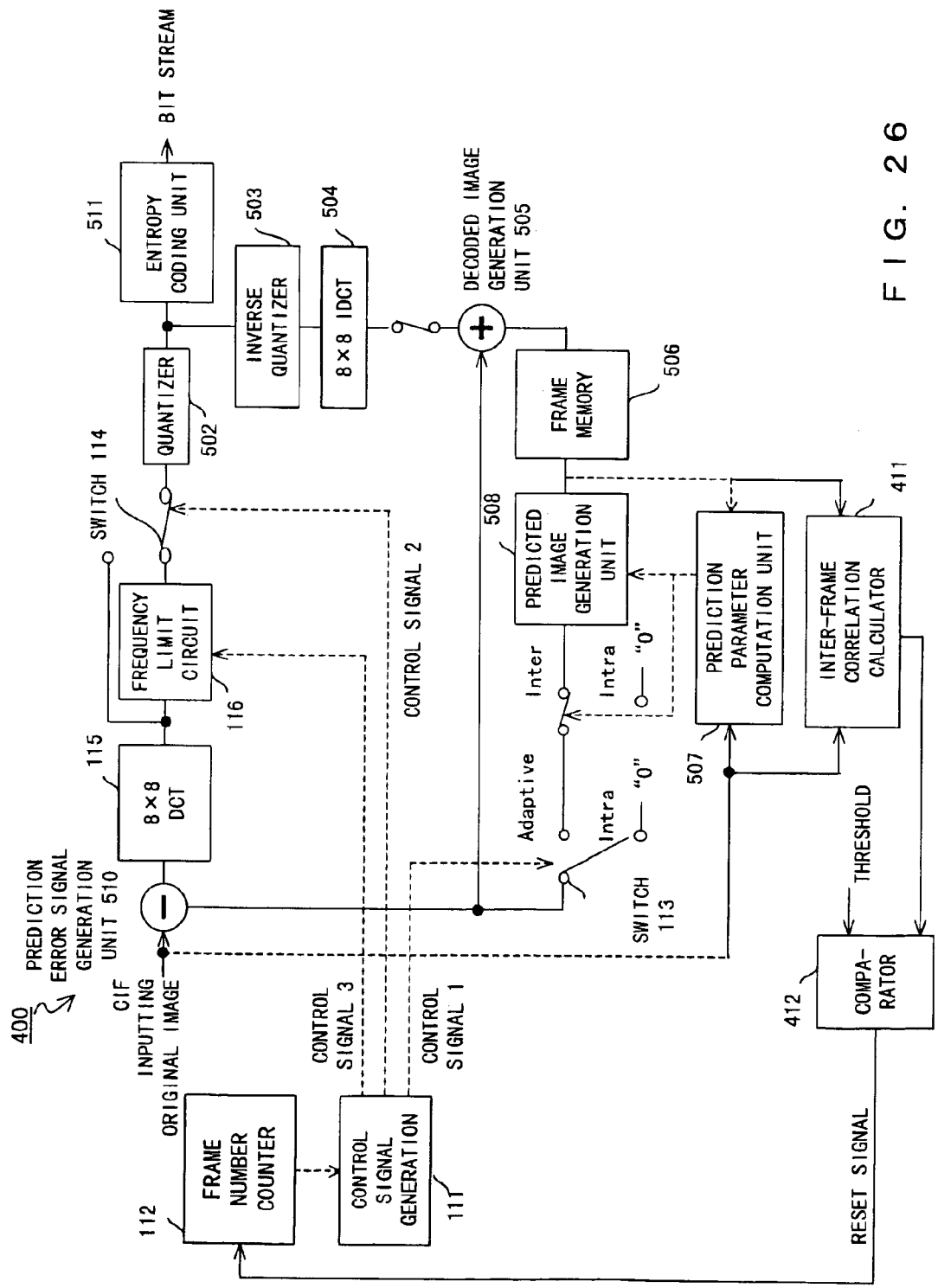
FIG. 26 shows a practical example of the encoder shown in FIG. 25.

FIG. 26 shows a practical embodiment of the encoder 400 shown in FIG. 25. The encoder is based on the configuration shown in FIG. 11. The correlation measurement unit 401 shown in FIG. 25 is realized by an inter-frame correlation calculator 411 and a comparator 412.

The inter-frame correlation calculator 411 checks the correlation between an image in a frame and an image in the previous frame. Practically, for example, the corresponding pixels in the two images are compared with each other pixel by pixel, and the number of matched pixels is counted to check the correlation. The inter-frame correlation calculator 411 can check the correlation in a frame unit or in a block unit.

The comparator 412 compares a predetermined threshold with an output of the inter-frame correlation calculator 411. When the value (number of matched pixels) counted by the inter-frame correlation calculator 411 is smaller than the threshold, the comparator 412 assumes that a scene in the moving picture has been switched into another scene, and outputs a reset signal. On the other hand, when the value counted by the inter-frame correlation calculator 411 is larger than the threshold, the comparator 412 assumes that the scene has not been switched into another scene, and does not issue a reset signal.

When the inter-frame correlation calculator 411 checks the correlation for each block, the comparator 412 compares the output of the inter-frame correlation calculator 411 with the threshold for each block. In this case, the comparator 412 outputs a reset signal when, for example, the value counted by the inter-frame correlation calculator 411 is smaller than the threshold for more than n blocks.

Figure 27:
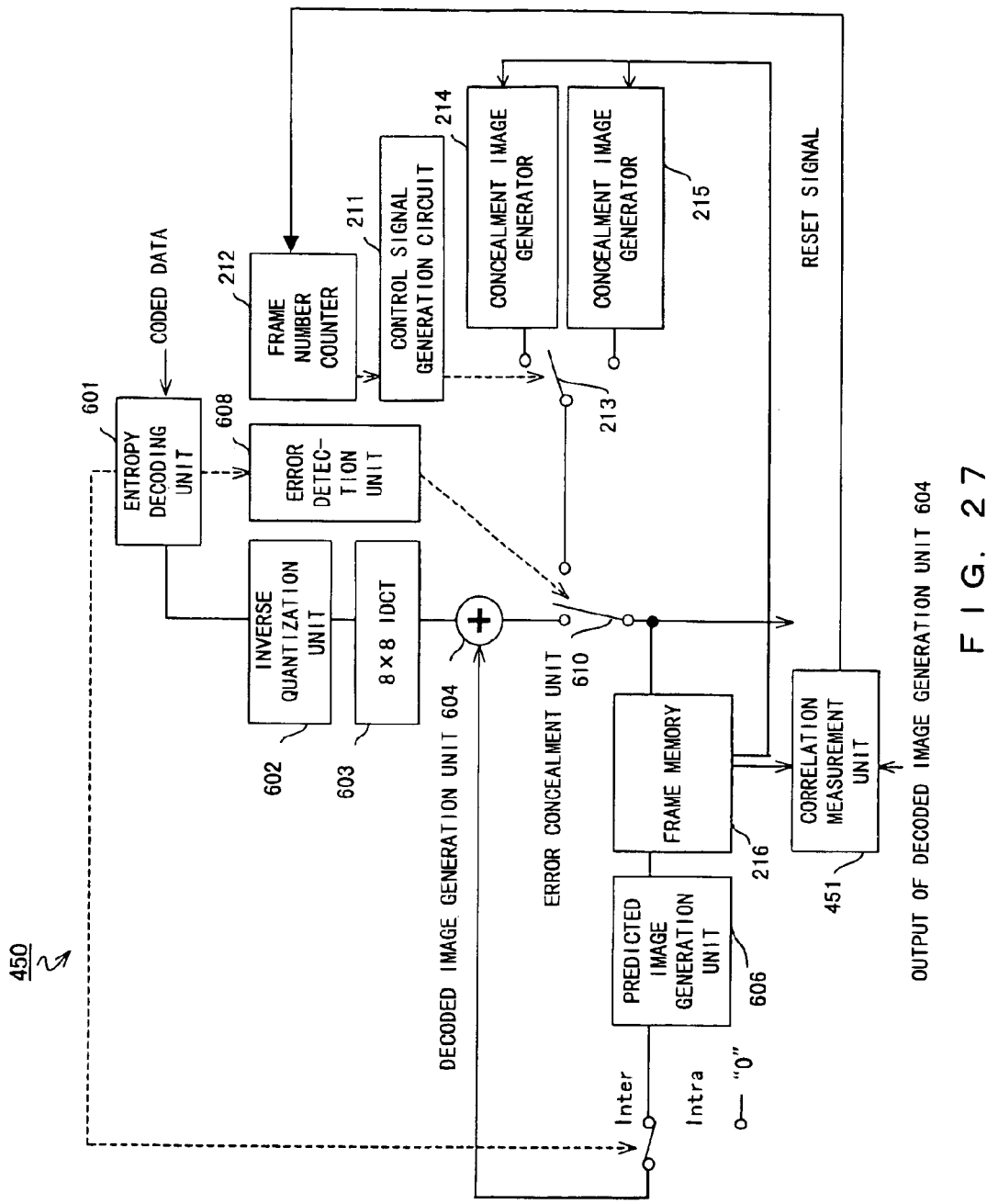
FIG. 27 is a block diagram of the decoder according to another embodiment of the present invention.

As described above, when the encoder 400 is provided with the correlation measurement unit 401 (the inter-frame correlation calculator 411, the comparator 412), the corresponding function can be provided in the decoder. That is, as shown in FIG. 27, a decoder 450 can be provided with a correlation measurement unit 451 so that a reset signal for resetting the frame number counter 212 can be generated when a scene is switched into another scene in moving picture. In this case, the correlation measurement unit 451 checks the correlation between the image data output from the decoded image generation unit 604 and the image data stored in the frame memory 216, and generates a reset signal when the correlation value is lower than a predetermined value.

When the reset signal is generated, the control signal generation circuit 211 provides a signal for selecting an output of the concealment image generator 214 for the switch 213. Therefore, if an error occurs in a block in the frame immediately after the frame in which a scene of moving picture has been switched into another scene, then the error concealment unit 610 conceals the error using the image in another block in that frame. It is assumed that the image obtained in the above described error concealing process looks more natural than the image obtained by concealing the error using the image obtained before switching a scene.

In the embodiment described by referring to FIGS. 5 through 27, the amount of information about data to be transmitted is reduced by lowering the spatial resolution of an image. However, the present invention is not limited to this method, but the amount of information can be reduced in other methods. For example, the quantizing step in the quantizing process can be changed. That is, for example, in the system for assigning 8 bits to each pixel in a normal operation, only 4 bits can be assigned to each pixel when the communications start.

In the above described embodiment, the amount of information about data to be transmitted in a plurality of consecutive frames containing the first frame is reduced, but the present invention is not limited to this method. For example, since the intraframe coding process is performed on the image data in the first frame in the conventional encoder, the amount of information does not increase as compared with the conventional system even without reducing the amount of information to be transmitted for the first frame, thereby causing no further transmission delay.

Furthermore, it is not necessary to reduce the amount of information about data to be transmitted for all frames in which the intra-frame coding process is forcibly performed. That is, among the frames in which the intra-frame coding process is forcibly performed, the amount of information can be reduced for the necessary number of frames to avoid the transmission delay. In other words, the present invention is applied to a method of reducing the amount of information in one or more frames in a plurality of frames among which the intra-frame coding process is forcibly performed when the communications start.

The above described configuration can be easily realized by changing the control signal 2 in the encoder shown in FIG. 11 or 21.

Furthermore, the above described embodiment is based on the system for transmitting image data, but the present invention is not limited to this configuration, but can be applied, for example, to a device for storing image data.

According to the present invention, although a transmission error has occurred immediately after a scene has been switched into another scene in moving picture or at the start of communicating moving picture data, a good and natural image can be regenerated in a short time. The effect is outstanding in an environment, such as a radio communications system, in which a transmission error frequently occurs.

What is claimed is:

1. A moving picture encoder, which divides an image in each frame of moving picture into a plurality of blocks and performs an encoding process on each block, comprising:
   a coding unit performing an intra-frame coding process or an inter-frame coding process on given data; and
   an information amount reduction unit reducing an amount of information about given data, wherein
   for a plurality of consecutive frames containing a first frame, said coding unit performs the intra-frame coding process on each block, and said information amount reduction unit reduces an amount of information about data coded by said coding unit; and
   for frames subsequent to the plurality of frames, said coding unit adaptively performs the intra-frame coding, process or the inter-frame coding process on each block.

2. The encoder according to claim 1, wherein said information amount reduction unit reduces the amount of information in each block by lowering spatial resolution of an image in the plurality of frames.

3. The encoder according to claim 1, further comprising an information amount adjustment unit stepwise increasing an amount of information in each block for frames subsequent to the plurality of frames from a state in which said information amount reduction unit has reduced the amount of information.

4. The encoder according to claim 3, wherein said information amount adjustment unit stepwise raises the spatial resolution of an image in frames subsequent to the plurality of frames.

5. The encoder according to claim 1, further comprising a transform unit orthogonally transforming coded data obtained by said coding unit, wherein said information amount reduction unit outputs only data of a direct current element among data of frequency elements generated by said transform unit.

6. The encoder according to claim 5, wherein said information amount adjustment unit stepwise extends a range of a frequency of data of an AC element to be selected and outputted among data of frequency elements generated by said transform unit for frames subsequent to the plurality of frames.

7. A moving picture coding method of dividing an image in each frame of moving picture into a plurality of blocks and performing an encoding process on each block, comprising:
   performing an intra-frame coding process on each block for a plurality of consecutive frames containing a first frame;
   reducing an amount of informal about the encoded data for the plurality of frames; and
   adaptively performing the intra-frame coding process or an inter-frame coding process on each block for frames subsequent to the plurality of frames.

8. A moving picture encoder, which divides an image in each frame of moving picture into a plurality of blocks and performs an encoding process on each block, comprising:
   coding means for performing an intra-frame coding process or an inter-frame coding process on given data; and
   information amount reduction means for reducing an amount of information about given data, wherein
   for a plurality of consecutive frames containing a first frame, said coding means performs the intraframe coding process on each block, and said information amount reduction means reduces an amount of information about data coded by said coding means; and
   for frames subsequent to the plurality of frames, said coding means adaptively performs the intra-frame coding process or the inter-frame coding process on each block.

9. A moving picture encoder, which divides an image in each frame of moving picture into a plurality of blocks and performs an encoding process on each block, comprising:
   a single coding unit selectively performing an intra-frame coding process or an inter-frame coding process on input data; and
   an information amount reduction unit reducing an amount of information of supplied data, and
   wherein for a plurality of consecutive frames containing a first frame, said coding unit performs the intra-frame coding process on each block, and said information amount reduction unit reduces an amount of information of the data intra-frame coded by said coding unit, and for frames subsequent to the plurality of consecutive frames, said coding unit adaptively switching between performing one of the intra-frame coding process and inter-frame coding process on each block.

10. A moving picture encoder method, which divides an image in each frame of moving picture into a plurality of blocks and performs an encoding process on each block, said method comprising:
    intra-frame coding consecutive frames including a first frame;
    performing data reduction on the encoded consecutive frames; and
    adaptively switching between the intra-frame coding and inter-frame coding for frames subsequent to the consecutive frames.

11. A moving picture encoder method, which divides an image in each frame of moving picture into a plurality of blocks and performs an encoding process on each block, said method comprising:
    intra-frame coding consecutive frames including a first frame using a single coding unit;
    performing data reduction on the encoded consecutive frames; and
    adaptively switching between the intra-frame coding and inter-frame coding for frames subsequent to the consecutive frames using the single coding unit.

* * * * *

UNITED STATES PATENT AND TRADEMARK OFFICE
CERTIFICATE OF CORRECTION

PATENT NO. : 6,917,648 B1
DATED : July 12, 2005
INVENTOR(S) : Eishi Morimatsu et al.

It is certified that error appears in the above-identified patent and that said Letters Patent is hereby corrected as shown below:

Column 19,
Line 32, after "intra-frame coding" delete ".".

Column 20,
Line 1, delete "informal" and insert -- information --.

Signed and Sealed this

Fourth Day of April, 2006

JON W. DUDAS
*Director of the United States Patent and Trademark Office*